(12) United States Patent
Kawasaki et al.

(10) Patent No.: US 7,715,172 B2
(45) Date of Patent: May 11, 2010

(54) MULTILAYER CAPACITOR

(75) Inventors: Kenichi Kawasaki, Echizen (JP); Noriyuki Inoue, Ritto (JP); Akira Saito, Ritto (JP); Makito Nakano, Yasu (JP); Kenichi Oshiumi, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 123 days.

(21) Appl. No.: 12/171,442

(22) Filed: Jul. 11, 2008

(65) Prior Publication Data

US 2009/0002918 A1    Jan. 1, 2009

Related U.S. Application Data

(63) Continuation of application No. PCT/JP2007/050089, filed on Jan. 9, 2007.

(30) Foreign Application Priority Data

Jan. 13, 2006  (JP) .............. 2006-006132
Aug. 25, 2006  (JP) .............. 2006-229570

(51) Int. Cl.
  *H01G 4/005*  (2006.01)
  *H01G 4/06*  (2006.01)
(52) U.S. Cl. ..................... 361/303; 361/311
(58) Field of Classification Search ............... 361/303, 361/305, 311
  See application file for complete search history.

(56) References Cited

U.S. PATENT DOCUMENTS 4,241,378 A * 12/1980 Dorrian ................ 361/305
5,600,533 A    2/1997 Sano et al.
5,687,055 A * 11/1997 Miki ..................... 361/305
5,781,402 A *  7/1998 Fujiyama et al. ......... 361/321.4
5,805,409 A *  9/1998 Takahara et al. .......... 361/303

(Continued)

FOREIGN PATENT DOCUMENTS

JP    06-163311 A    6/1994

(Continued)

OTHER PUBLICATIONS

Official Communication issued in International Patent Application No. PCT/JP2007/050089, mailed on May 1, 2007.

*Primary Examiner*—Eric Thomas
(74) *Attorney, Agent, or Firm*—Keating & Bennett, LLP

(57) ABSTRACT

A multilayer capacitor includes a capacitor body in which internal electrodes in a first internal electrode group are overlapped with internal electrodes in a second internal electrode group with dielectric layers sandwiched therebetween. A first external electrode has a first wraparound portion and a second wraparound portion, and a second external electrode has a third wraparound portion and a fourth wraparound portion. The volume proportions of the effective layers in a first area sandwiched between the first wraparound portion and the second wraparound portion and in a third area sandwiched between the third wraparound portion and the fourth wraparound portion are set to at least about 10%. The volume proportions of the effective layers in a second area toward a lower surface in the first area and in a fourth area toward the lower surface in the third area are set to about 15% or less. The external dimensions of the multilayer capacitor 1 are about 1.6±0.1 mm in length by about 0.8±0.1 mm in width by about 0.8±0.1 mm in thickness.

20 Claims, 9 Drawing Sheets

U.S. PATENT DOCUMENTS

| | | | |
|---|---|---|---|
| 5,853,515 A | | 12/1998 | Sano et al. |
| 6,052,272 A | * | 4/2000 | Kuroda et al. ............... 361/303 |
| 6,143,109 A | | 11/2000 | Sano et al. |
| 6,331,929 B1 | * | 12/2001 | Masuda ....................... 361/303 |
| 6,362,947 B1 | * | 3/2002 | Chazono .................. 361/306.3 |

FOREIGN PATENT DOCUMENTS

| | | |
|---|---|---|
| JP | 07-032936 U | 6/1995 |
| JP | 08-181033 A | 7/1996 |
| JP | 11-150037 A | 6/1999 |
| JP | 2000-124057 A | 4/2000 |

* cited by examiner

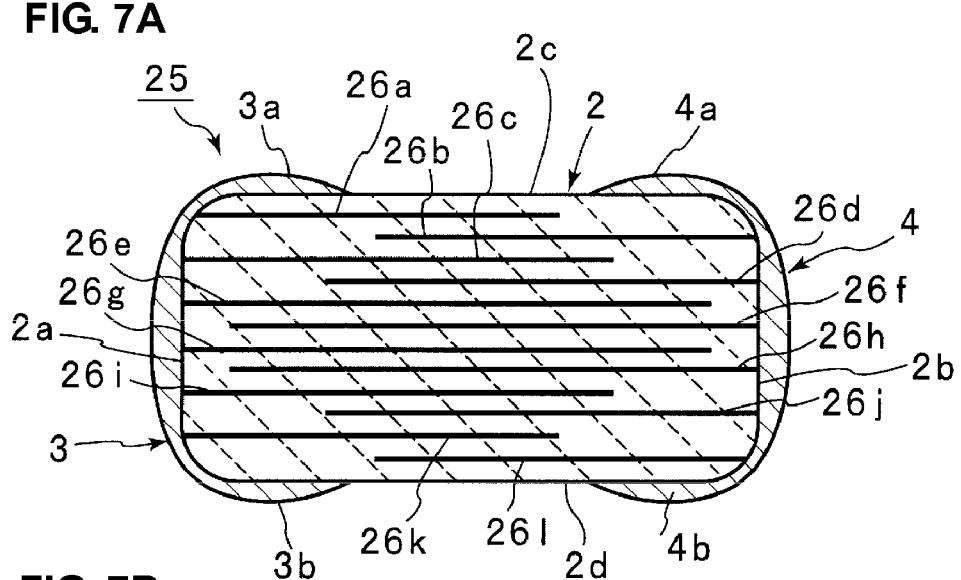
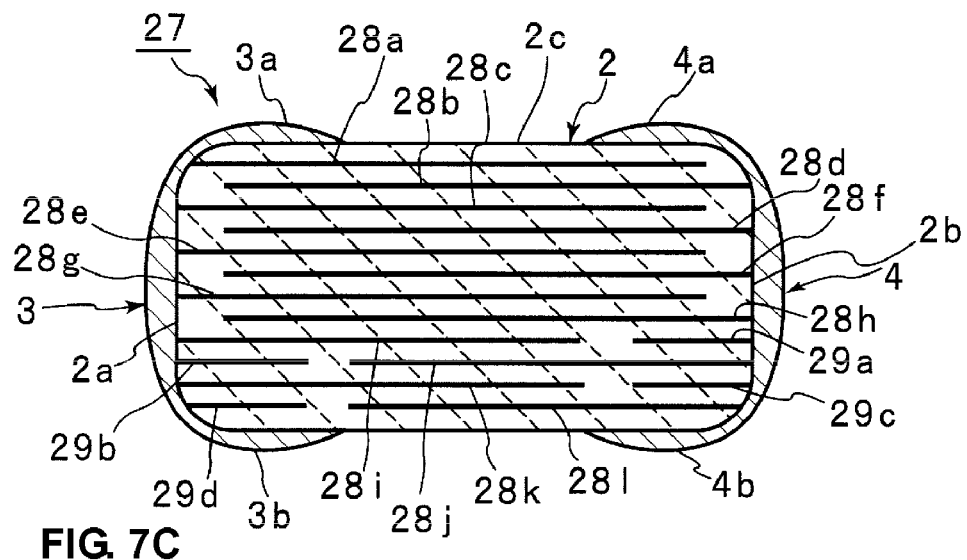
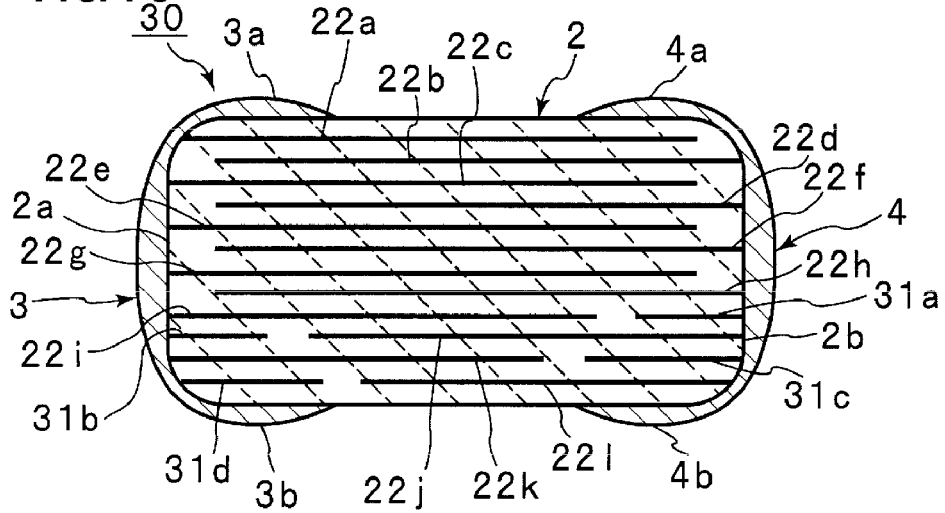

MULTILAYER CAPACITOR

BACKGROUND OF THE INVENTION

1. Field of the Invention

The present invention relates to multilayer capacitors using capacitor bodies in which internal electrodes are layered with dielectric layers sandwiched therebetween. More particularly, the present invention relates to a multilayer capacitor having an improved arrangement of dielectric layers sandwiched between internal electrodes connected to different voltages.

2. Description of the Related Art

Various multilayer capacitors are in widespread use in electric apparatuses. Japanese Unexamined Patent Application Publication No. 8-69939 discloses a multilayer capacitor shown in FIG. 11. A multilayer capacitor 101 includes a capacitor body 102 manufactured by layering multiple ceramic green sheets and firing the layered ceramic green sheets. Multiple internal electrodes 103a to 103d are arranged in the capacitor body 102 so as to be overlapped with each other with ceramic dielectric layers sandwiched therebetween. The ceramic dielectric layers define the capacitor body. The internal electrodes 103a and 103c extend to one end 102a of the capacitor body 102 and the internal electrodes 103b and 103d extend to the other end 102b thereof. External electrodes 104 and 105 are provided so as to cover the one end 102a and the other end 102b, respectively.

The shapes of the internal electrodes, the thicknesses of the dielectric layers, the sizes of the capacitor body, and other characteristics are adjusted in the multilayer capacitor of this type so as to prevent occurrences of cracks as the temperature of the multilayer capacitor varies and to prevent occurrences of cracks caused by breakdown due to any mechanical stress applied to the multilayer capacitor. Various multilayer capacitors are disclosed in, for example, Japanese Unexamined Patent Application Publication No. 2000-124057, Japanese Unexamined Patent Application Publication No. 6-163311, Japanese Unexamined Patent Application Publication No. 8-181033, Japanese Unexamined Patent Application Publication No. 11-150037, and Japanese Unexamined Utility Model Registration Application Publication No. 7-32936.

As described above, the thicknesses of the dielectric layers, the shapes and sizes of the internal electrodes, and other characteristics have been changed in the multilayer capacitor so as to prevent occurrences of cracks caused by any mechanical stress applied to the multilayer capacitor.

Reduction in size of the multilayer capacitors is increasingly required, as in other electric apparatuses. Accordingly, it is highly desirable to promote the reduction in size and increase in capacitance of the multilayer capacitors.

In order to increase the capacitance of the multilayer capacitors, the proportion of portions in which the internal electrodes connected to different voltages are overlapped with each other with the dielectric layers sandwiched therebetween should be increased.

During driving of the multilayer capacitors, vibrations attributed to electrostriction can be caused in the dielectric layers connected to different voltages. In particular, the vibration attributed to the electrostriction is likely to increases when the proportion of the portions, in which the internal electrodes connected to different voltages are overlapped with each other with the dielectric layers sandwiched therebetween, is increased in order to promote the increase in capacitance of the multilayer capacitors. As a result, the substrates on which the multilayer capacitors are mounted may vibrate to produce an undesired sound, that is, a sound caused by the substrate vibration and/or to damage the portions at which the multilayer capacitors are mounted on the substrates.

SUMMARY OF THE INVENTION

To overcome problems described above, preferred embodiments of the present invention provide a highly reliable multilayer capacitor in which the occurrence of an undesired sound caused by displacement attributed to the electrostriction in the dielectric layers sandwiched between the internal electrodes connected to different voltages is suppressed and in which the damage to the mounting portions caused by the displacement is prevented.

A multilayer capacitor according to a first preferred embodiment of the present invention includes a capacitor body including a plurality of layered dielectric layers and having two opposed end surfaces and two opposed main surfaces, a first external electrode that is provided on one of the end surfaces of the capacitor body and that includes a first wraparound portion extending on one of the main surfaces of the capacitor body and a second wraparound portion extending on the other main surface thereof, a second external electrode that is provided on the other end surface of the capacitor body and that includes a third wraparound portion extending on the one main surface of the capacitor body and a fourth wraparound portion extending on the other main surface thereof, a first internal electrode group including internal electrodes that are provided between the dielectric layers and that are connected to the first external electrode, and a second internal electrode group including internal electrodes that are provided between the dielectric layers and that are connected to the second external electrode. When a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 10%, the volume proportion of the effective layers in a second area occupying the lower half toward the other main surface in the first area is set to about 15% or less, the volume proportion of the effective layers in a third area sandwiched between the third wraparound portion and the fourth wraparound portion in the capacitor body is set to 10% or more, and the volume proportion of the effective layers in a fourth area occupying the lower half toward the other main surface in the third area is set to 15% or less. The external dimensions of the configuration including the capacitor body, the first external electrode, and the second external electrode are about 1.6±0.1 mm in length by about 0.8±0.1 mm in width by about 0.8±0.1 mm in thickness.

A multilayer capacitor according to a second preferred embodiment of the present invention includes a capacitor body including a plurality of layered dielectric layers and having two opposed end surfaces and two opposed main surfaces, a first external electrode that is provided on one of the end surfaces of the capacitor body and that includes a first wraparound portion extending on one of the main surfaces of the capacitor body and a second wraparound portion extending on the other main surface thereof, a second external electrode that is provided on the other end surface of the capacitor body and that includes a third wraparound portion extending on the one main surface of the capacitor body and a fourth wraparound portion extending on the other main surface thereof, a first internal electrode group including internal electrodes that are provided between the dielectric layers and that are connected to the first external electrode, and a second internal electrode group including internal electrodes that are provided between the dielectric layers and that are connected to the second external electrode. When a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 20%, the volume proportion of the effective layers in a second area occupying the lower half toward the other main surface in the first area is set to about 35%, the volume proportion of the effective layers in a third area sandwiched between the third wraparound portion and the fourth wraparound portion in the capacitor body is set to at least about 20%, and the volume proportion of the effective layers in a fourth area occupying the lower half toward the other main surface in the third area is set to about 35% or less. The external dimensions of the configuration including the capacitor body, the first external electrode, and the second external electrode are about 2.0±0.1 mm in length by about 1.25±0.1 mm in width by about 1.25±0.1 mm in thickness.

A multilayer capacitor according to a third preferred embodiment of the present invention includes a capacitor body including a plurality of layered dielectric layers and having opposed end surfaces and opposed main surfaces, a first external electrode that is provided on one of the end surfaces of the capacitor body and that includes a first wraparound portion extending on one of the main surfaces of the capacitor body and a second wraparound portion extending on the other main surface thereof, a second external electrode that is provided on the other end surface of the capacitor body and that includes a third wraparound portion extending on the one main surface of the capacitor body and a fourth wraparound portion extending on the other main surface thereof, a first internal electrode group including internal electrodes that are provided between the dielectric layers and that are connected to the first external electrode, and a second internal electrode group including internal electrodes that are provided between the dielectric layers and that are connected to the second external electrode. When a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 20%, the volume proportion of the effective layers in a second area occupying the lower half toward the other main surface in the first area is set to about 35% or less, the volume proportion of the effective layers in a third area sandwiched between the third wraparound portion and the fourth wraparound portion in the capacitor body is set to at least about 20%, and the volume proportion of the effective layers in a fourth area occupying the lower half toward the other main surface in the third area is set to about 35% or less. The external dimensions of the configuration including the capacitor body, the first external electrode, and the second external electrode are about 3.2±0.15 mm in length by about 1.6±0.15 mm in width by about 1.6±0.15 mm in thickness.

A multilayer capacitor according to a fourth preferred embodiment of the present invention includes a capacitor body including a plurality of layered dielectric layers and having opposed end surfaces and opposed main surfaces, a first external electrode that is provided on one of the end surfaces of the capacitor body and that includes a first wraparound portion extending on one of the main surfaces of the capacitor body and a second wraparound portion extending on the other main surface thereof, a second external electrode that is provided on the other end surface of the capacitor body and that includes a third wraparound portion wrapping around the one main surface of the capacitor body and a fourth wraparound portion extending on the other main surface thereof, a first internal electrode group including internal electrodes that are provided between the dielectric layers and that are connected to the first external electrode, and a second internal electrode group including internal electrodes that are provided between the dielectric layers and that are connected to the second external electrode. When a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 20%, the volume proportion of the effective layers in a second area occupying the lower half toward the other main surface in the first area is set to about 35% or less, the volume proportion of the effective layers in a third area sandwiched between the third wraparound portion and the fourth wraparound portion in the capacitor body is set to at least about 20%, and the volume proportion of the effective layers in a fourth area occupying the lower half toward the other main surface in the third area is set to about 35%. The external dimensions of the configuration including the capacitor body, the first external electrode, and the second external electrode are about 3.2±0.3 mm in length by about 2.5±0.2 mm in width by about 2.5±0.2 mm in thickness.

A multilayer capacitor according to a fifth preferred embodiment of the present invention includes a capacitor body including a plurality of layered dielectric layers and having opposed end surfaces and opposed main surfaces, a first external electrode that is provided on one of the end surfaces of the capacitor body and that includes a first wraparound portion extending on one of the main surfaces of the capacitor body and a second wraparound portion extending on the other main surface thereof, a second external electrode that is provided on the other end surface of the capacitor body and that includes a third wraparound portion extending on the one main surface of the capacitor body and a fourth wraparound portion extending on the other main surface thereof, a first internal electrode group including internal electrodes that are provided between the dielectric layers and that are connected to the first external electrode, and a second internal electrode group including internal electrodes that are provided between the dielectric layers and that are connected to the second external electrode. When a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 10%, the volume proportion of the effective layers in a second area occupying the lower half toward the other main surface in the first area is set to about 10% or less, the volume proportion of the effective layers in a third area sandwiched between the third wraparound portion and the fourth wraparound portion in the capacitor body is set to at least about 10%, and the volume proportion of the effective layers in a fourth area occupying the lower half toward the other main surface in the third area is set to about 10% or less. The external dimensions of the configuration including the capacitor body, the first external electrode, and the second external electrode are about 1.0±0.05 mm in length by about 0.5±0.05 mm in width by about 0.5±0.05 mm in thickness.

The first to fifth preferred embodiments of the present invention relate to improved multilayer capacitors having sizes of about 1.6 mm×about 0.8 mm×about 0.8 mm, about 2.0 mm×about 1.25 mm×about 1.25 mm, about 3.2 mm×about 1.6 mm×about 1.6 mm, about 3.2 mm×about 2.5 mm×about 2.5 mm, and about 1.0 mm×about 0.5 mm×about 0.5 mm, which are in widespread use as the multilayer capacitors. The figures after the values of length, width, and thickness in the external dimensions in the first to fifth preferred embodiment of the present invention, that is, ±0.1 mm, ±0.15 mm, ±0.2 mm, ±0.3 mm, and ±0.05 mm denote the manufacturing tolerances.

The first and second internal electrode groups are preferably provided such that the effective layers extend to the first and third areas in the central portion in the thickness direction connecting the one main surface of the capacitor body and the other main surface thereof, viewed form a cross section that includes a substantially straight line connecting the one end of the capacitor body and the other end thereof and that is substantially perpendicular to the first and second internal electrode groups. When the portion in which the effective layers extend to the first and third areas is referred to as a central area, effective-layer excluded portions in which the effective layers do not extend to the first and third areas are preferably provided in an area toward the other main surface with respect to the central portion. It is preferable that $T_0/L_0$ be set to a value within a range from about 0.5 to about 1.5 where "$T_0$" denotes the dimension of each effective-layer excluded portion in the thickness direction and "$L_0$" denotes the dimension thereof in the direction connecting the one end of the capacitor body and the other end thereof. With the above-described configuration, the effective layers are reduced in volume near the mounting surface and the displacement in the gap portions is further reduced near the mounting surface. Accordingly, it is possible to more effectively suppress the sound caused by the substrate vibration during the driving of the multilayer capacitor while increasing the capacitance of the multilayer capacitor.

It is preferable that, in the multilayer capacitor, the direction connecting the one end of the capacitor body and the other end thereof be a lengthwise direction, the direction connecting the one main surface of the capacitor body and the other main surface thereof be a height direction, and the direction orthogonal to the lengthwise and height directions of the capacitor body be a widthwise direction. The dimension of the first and second external electrodes along the widthwise direction is preferably less than the width of the multilayer capacitor. With the above-described configuration, it is possible to reduce the size of the external electrodes and to effectively suppress the transmission of the vibration of the multilayer capacitor to the substrate through the external electrodes. Accordingly, it is possible to effectively suppress the sound caused by the substrate vibration. It is more preferable that the width of the external electrodes be about 92% or less of the width of the multilayer capacitor. With this configuration, it is possible to more effectively suppress the sound caused by the substrate vibration.

According to the first preferred embodiment of the present invention, when the portion sandwiched between the internal electrodes in the first internal electrode group connected to the first external electrode and the internal electrodes in the second internal electrode group connected to the second external electrode is defined as the effective layers in the multilayer capacitor having a size of about 1.6 mm×about 0.8 mm×about 0.8 mm, the volume proportion of the effective layers in the first area sandwiched between the first wraparound portion and the second wraparound portion of the first external electrode in the capacitor body is set to at least about 10% and the volume proportion of the effective layers in the second area occupying the lower half toward the other main surface in the first area is set to about 15% or less. Similarly, at the side of the second external electrode, the volume proportion of the effective layers in the third area is set to at least about 10% and the volume proportion of the effective layers in the fourth area is set to about 15% or less. Consequently, it is possible not only to produce a larger capacitance but also to suppress the displacement attributed to the electrostriction during the driving of the multilayer capacitor. The suppression of the displacement attributed to the electrostriction inhibits vibration of the substrate on which the multilayer capacitor is mounted during the driving and to produce the sound caused by the substrate vibration. In addition, the suppression of the displacement prevents damage to the mounting portions.

According to the second preferred embodiment of the present invention, the volume proportion of the effective layers in the first area sandwiched between the first wraparound portion and the second wraparound portion of the first external electrode is set to at least about 20%, the volume proportion of the effective layers in the second area is set to about 35% or less, the volume proportion of the effective layers in the third area sandwiched between the third and fourth wraparound portions is set to at least about 20%, and the volume proportion of the effective layers in the fourth area is set to about 35% or less. Consequently, it is possible to produce a larger capacitance with the small multilayer capacitor, to suppress the displacement attributed to the electrostriction during the driving of the multilayer capacitor, and to suppress the sound caused by the substrate vibration. In addition, the above-described configuration inhibits damage to the mounting portions.

According to the third preferred embodiment of the present invention, the volume proportion of the effective layers in the first area sandwiched between the first wraparound portion and the second wraparound portion of the first external electrode is set to at least about 20%, the volume proportion of the effective layers in the second area is set to about 35% or less, the volume proportion of the effective layers in the third area sandwiched between the third and fourth wraparound portions is set to at least about 20%, and the volume proportion of the effective layers in the fourth area is set to about 35% or less. Consequently, it is possible to produce a larger capacitance with the small multilayer capacitor, to suppress the displacement attributed to the electrostriction during the driving of the multilayer capacitor, and to suppress the sound caused by the substrate vibration. In addition, the above-described configuration prevents damage to the mounting portions.

According to the fourth preferred embodiment of the present invention, the volume proportion of the effective layers in the first area sandwiched between the first wraparound portion and the second wraparound portion of the first external electrode is set to at least about 20%, the volume proportion of the effective layers in the second area is set to about 35% or less, the volume proportion of the effective layers in the third area sandwiched between the third and fourth wraparound portions is set to at least about 20%, and the volume proportion of the effective layers in the fourth area is set to about 35% or less. Consequently, it is possible to produce a larger capacitance with the small multilayer capacitor, to suppress the displacement attributed to the electrostriction during the driving of the multilayer capacitor, and to suppress the sound caused by the substrate vibration. In addition, the above-described configuration prevents damage to the mounting portions.

According to the fifth preferred embodiment of the present invention, the volume proportion of the effective layers in the first area sandwiched between the first wraparound portion and the second wraparound portion of the first external electrode is set to at least about 10%, the volume proportion of the effective layers in the second area is set to about 10% or less, the volume proportion of the effective layers in the third area sandwiched between the third and fourth wraparound portions is set to at least about 10%, and the volume proportion of the effective layers in the fourth area is set to about 10% or less. Consequently, it is possible to produce a larger capacitance with the small multilayer capacitor, to suppress the displacement attributed to the electrostriction during the driving of the multilayer capacitor, and to suppress the sound caused by the substrate vibration. In addition, the above-described configuration prevents damage to the mounting portions.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 7A, 7B, and 7C are front cross-sectional views illustrating other modifications of the multilayer capacitor according to preferred embodiments of the present invention.

DETAILED DESCRIPTION OF PREFERRED EMBODIMENTS

Preferred embodiments of the present invention will herein be described with reference to the attached drawings.

Figure 1:
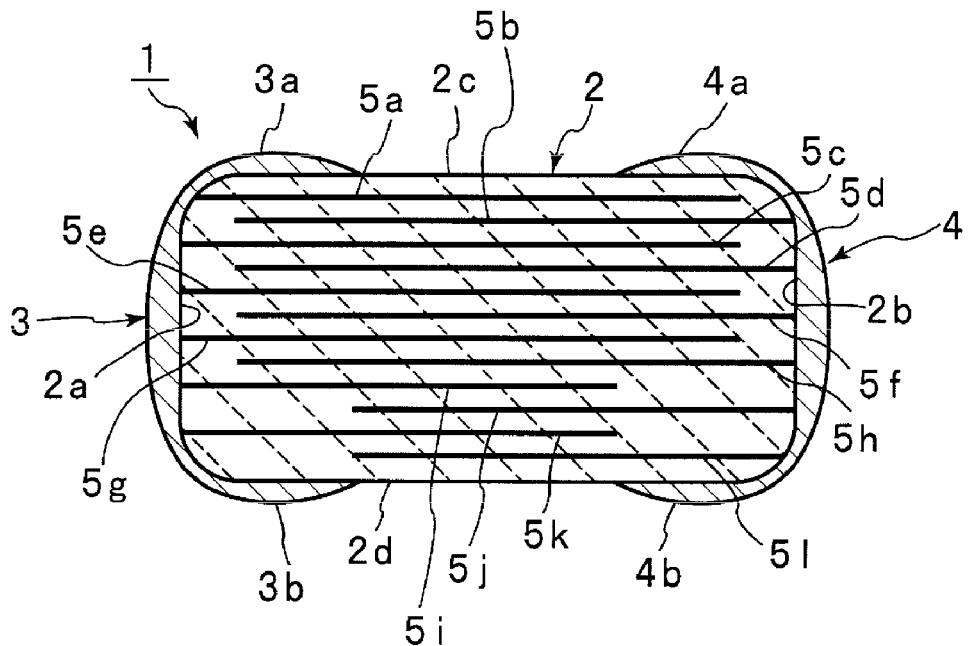
FIG. 1 is a front cross-sectional view of a multilayer capacitor according to a preferred embodiment of the present invention.

FIG. 1 is a front cross-sectional view of a multilayer capacitor according to a first preferred embodiment of the present invention. A multilayer capacitor 1 includes a substantially rectangular parallelepiped capacitor body 2. The capacitor body 2 is a ceramic sintered body manufactured by a well known firing technique in which ceramics are integrated with internal electrodes. In the firing technique, multiple ceramic green sheets are layered and fired with the internal electrodes sandwiched therebetween.

Accordingly, multiple dielectric layers are layered with the internal electrodes sandwiched therebetween in the capacitor body 2.

A first external electrode 3 is provided so as to cover an end surface 2a at one end of the capacitor body 2, and a second external electrode 4 is provided so as to cover a second end surface 2b at the other end thereof.

The external electrodes 3 and 4 are manufactured by the application and firing of conductive paste. The first external electrode 3 includes not only the portion on the end surface 2a but also a first wraparound portion 3a extending on an upper surface 2c, which is one main surface of the sintered body 2, and a second wraparound portion 3b extending on a lower surface 2d, which is the other main surface of the sintered body 2. Similarly, the second external electrode 4 includes a third wraparound portion 4a extending on the upper surface 2c and a fourth wraparound portion 4b extending on the lower surface 2d. Although the first and second wraparound portions mean extensions of the external electrodes extending on the one main surface and the lower surface, respectively, of the capacitor body in this description, the wraparound portions are generally provided so as to wrap around not only the upper surface 2c and the lower surface 2d but also the pair of side surfaces (not shown) in the manufacturing of the external electrodes.

The present invention is characterized by the volume proportion of effective layers described below in the direction connecting the upper surface 2c and the lower surface 2d, that is, in the direction connecting the one main surface and the other main surface. The one main surface is on one side in the thickness direction of the capacitor body in which the multiple internal electrodes are layered and the other main surface is on the other side in the thickness direction thereof. Accordingly, the wraparound portions (not shown) on the side surfaces are not described and the volume proportion will be described with respect to the first and second wraparound portions and the third and fourth wraparound portions.

Multiple internal electrodes 5a to 5l are arranged in the capacitor body 2 from the upper surface 2c to the lower surface 2d so as to be overlapped with each other with the dielectric layers sandwiched therebetween.

Of the internal electrodes 5a to 5l, a first internal electrode group including the internal electrodes 5a, 5c, 5e, 5g, 5i, and 5k extends to the first end surface 2a and is electrically connected to the first external electrode 3 on the end surface 2a. A second internal electrode group including the internal electrodes 5b, 5d, 5f, 5h, 5j, and 5l extends to the second end surface 2b and is electrically connected to the second external electrode 4 on the second end surface 2b.

The first and second internal electrode groups including the internal electrodes 5a to 5l are made of an appropriate metal or alloy, such as Ag, Ag—Pd, Ni, or Cu. Similarly, the external electrodes 3 and 4 are manufactured by the application and firing of conductive paste. The metallic material included in the conductive paste is an appropriate metal or alloy, such as Ag, Ag—Pd, Ni, or Cu, for example. The external electrodes may be manufactured by layering multiple electrode layers.

Electrostatic capacitances are produced in the dielectric layers sandwiched between pairs of the internal electrodes connected to different voltages. Accordingly, the dielectric layers sandwiched between pairs of the internal electrodes connected to different voltages are defined as the effective layers.

In the multilayer capacitor 1 according to the present preferred embodiment, the volume proportion of the effective layers in a first area sandwiched between the first and second wraparound portions in the capacitor body is at least about 10% and the volume proportion of the effective layers in a second area occupying the lower half toward the lower surface 2d in the first area is about 15% or less. In addition, the multilayer capacitor 1 according to the present preferred embodiment, at the side of the second end surface 2b, the volume proportion of the effective layers in a third area sandwiched between the third wraparound portion 4a and the fourth wraparound portion 4b is at least about 10% and that the volume proportion of the effective layers in a fourth area occupying the lower half toward the lower surface 2d in the third area is about 15% or less. This enables a higher electrostatic capacitance to be produced and prevents the displacement attributed to the electrostriction during driving of the multilayer capacitor. These advantages are described with reference to FIGS. 2 to 5.

Figure 2:
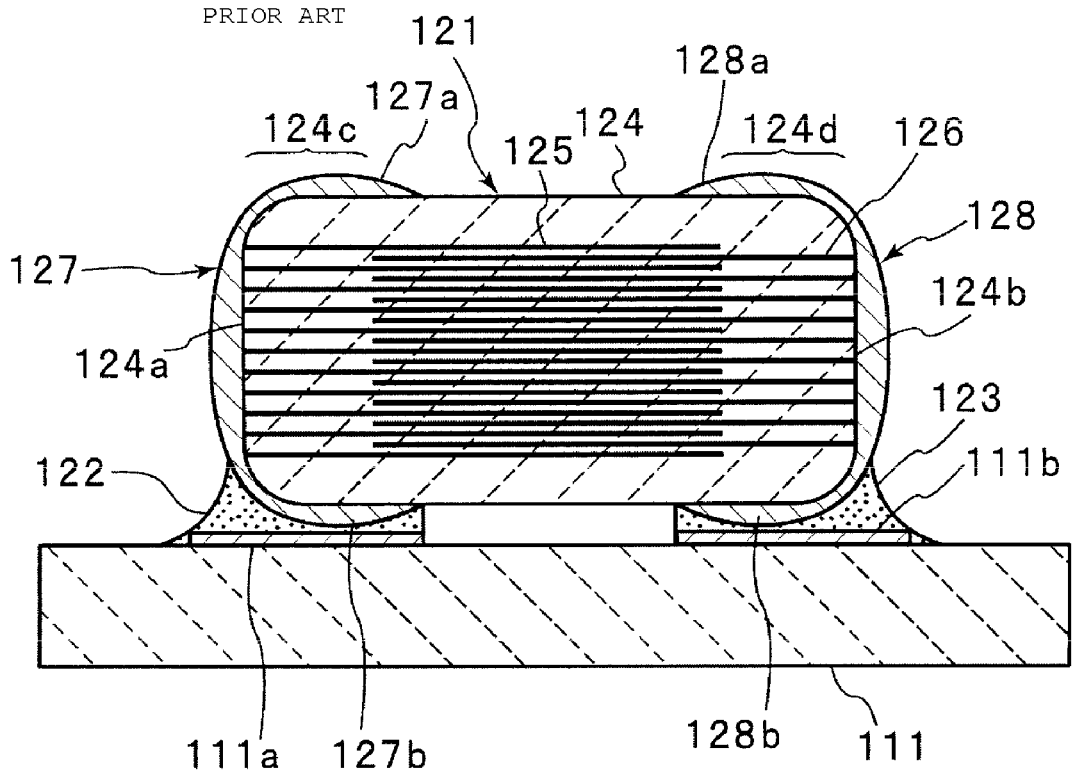
FIG. 2 is a front cross-sectional view illustrating the problems of the mounting structure of a multilayer capacitor in related art.

FIG. 2 is a partial front cross-sectional and broken view schematically showing a state in which a capacitor in related art is mounted on a substrate.

As shown in FIG. 2, electrode lands 111a and 111b are provided on a substrate 111. A multilayer capacitor 121 is soldered to the electrode lands 111a and 111b with solder portions 122 and 123 and mounted.

The multilayer capacitor 121 includes a capacitor body 124. A first internal electrode group 125 including multiple internal electrodes extends to a first end surface 124a of the capacitor body 124 and a second internal electrode group 126 including multiple internal electrodes extends to a second end surface 124b thereof.

A first external electrode 127 and a second external electrode 128 are provided so as to cover the first end surface 124a and the second end surface 124b, respectively. The external electrodes 127 and 128 not only cover the end surfaces 124a and 124b but also include wraparound portions extending on the upper surface, the lower surface, and the pair of side surfaces, as in the above-described preferred embodiment. Referring to FIG. 2, the first external electrode 127 includes a first wraparound portion 127a and a second wraparound portion 127b and the second external electrode 128 includes a third wraparound portion 128a and a fourth wraparound portion 128b.

In order to reduce the size of the multilayer capacitor 121 and to increase the capacitance thereof, it is desirable to increase the area in which the internal electrodes connected to different voltages are overlapped with each other.

Figure 3A:
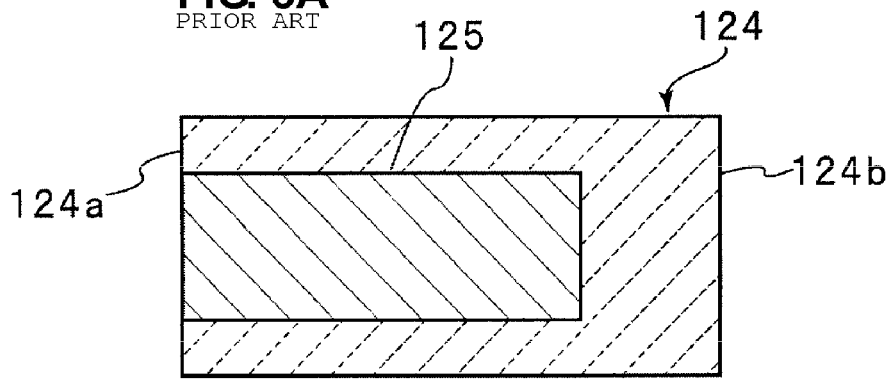
FIGS. 3A and 3B are plan cross-sectional views of the multilayer capacitor, illustrating the shapes of a first internal electrode group and a second internal electrode group in the multilayer capacitor shown in FIG. 2.
Figure 3B:
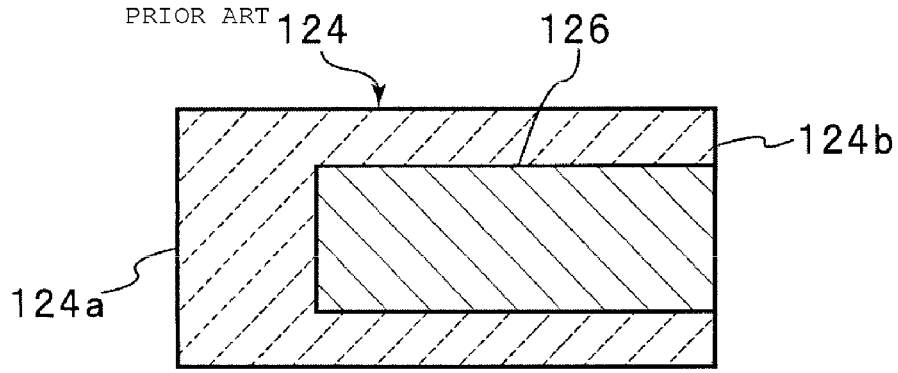

FIGS. 3A and 3B are plan cross-sectional views schematically showing the planar shapes of the first internal electrode group 125 including multiple internal electrodes and the second internal electrode group 126 including multiple internal electrodes. The first internal electrode group 125 including multiple internal electrodes is overlapped with the second internal electrode group 126 including multiple internal electrodes with the dielectric layers sandwiched therebetween in a central area in the direction connecting the first end surface 124a and the second end surface 124b. When the portion in which the first internal electrode group 125 including multiple internal electrodes is overlapped with the second internal electrode group 126 including multiple internal electrodes is defined as the effective layers, it is desirable to increase the volume proportion of the effective layers in order to produce a higher electrostatic capacitance. Accordingly, it is desirable to provide the effective layers in the portion of the capacitor body sandwiched between the first wraparound portion 127a and the second wraparound portion 127b and in the portion thereof sandwiched between the third wraparound portion 128a and the fourth wraparound portion 128b.

Referring to FIG. 2, gap portions 124c and 124d are provided outside the effective layers. In the gap portions 124c and 124d, the first internal electrode group 125 including multiple internal electrodes is not overlapped with the second internal electrode group 126 including multiple internal electrodes with the dielectric layers sandwiched therebetween. Since no voltage is applied to the gap portions 124c and 124d during the driving of the multilayer capacitor 121, the displacement attributed to the electrostriction is not substantially produced in the gap portions 124c and 124d.

When voltage is applied between the first internal electrode group 125 including multiple internal electrodes and the second internal electrode group 126 including multiple internal electrodes during the driving of the multilayer capacitor 121, the displacement attributed to the electrostriction is produced in the dielectric layers. This displacement includes (1) dilatation and shrinkage of the effective layers in the thickness direction, (2) shrinkage/reversion of the capacitor body 124 in the lengthwise direction L and in the widthwise direction W, and (3) deformation caused by the difference between the displacement of the effective layers in the thickness direction T and the displacement of the gap portions.

Figure 4:
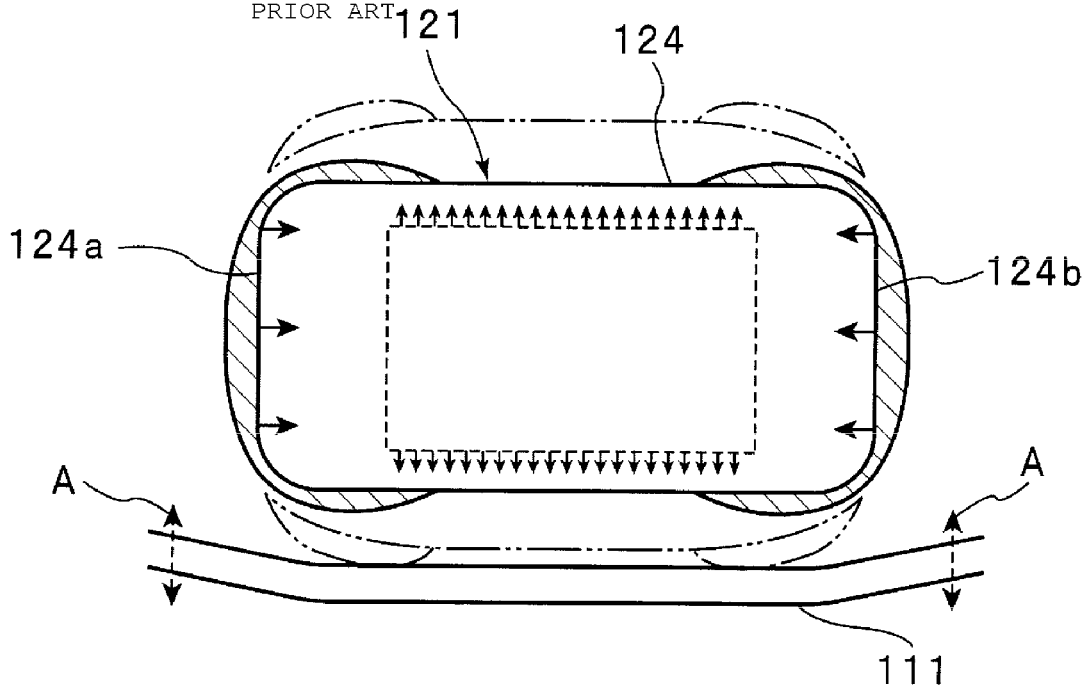
FIG. 4 is a schematic front cross-sectional view illustrating a state in which substrate vibration is caused by electrostriction in the mounting structure of the multilayer capacitor in the related art.

When the multilayer capacitor 121 is mounted on the substrate 111 and is driven, the multilayer capacitor 121 is deformed due to the displacement or deformation of the three types described above. As a result, as schematically shown in FIG. 4, the capacitor body 124 of the multilayer capacitor 121 repeats the deformation between a deformed state indicated by double-dotted chain lines and an original state indicated by solid lines. Accordingly, the substrate 111 bends in a manner shown by arrows A to produce a sound. In addition, the mounting portions with the solder portions 122 and 123 can be damaged due to the deformation.

Figure 5:
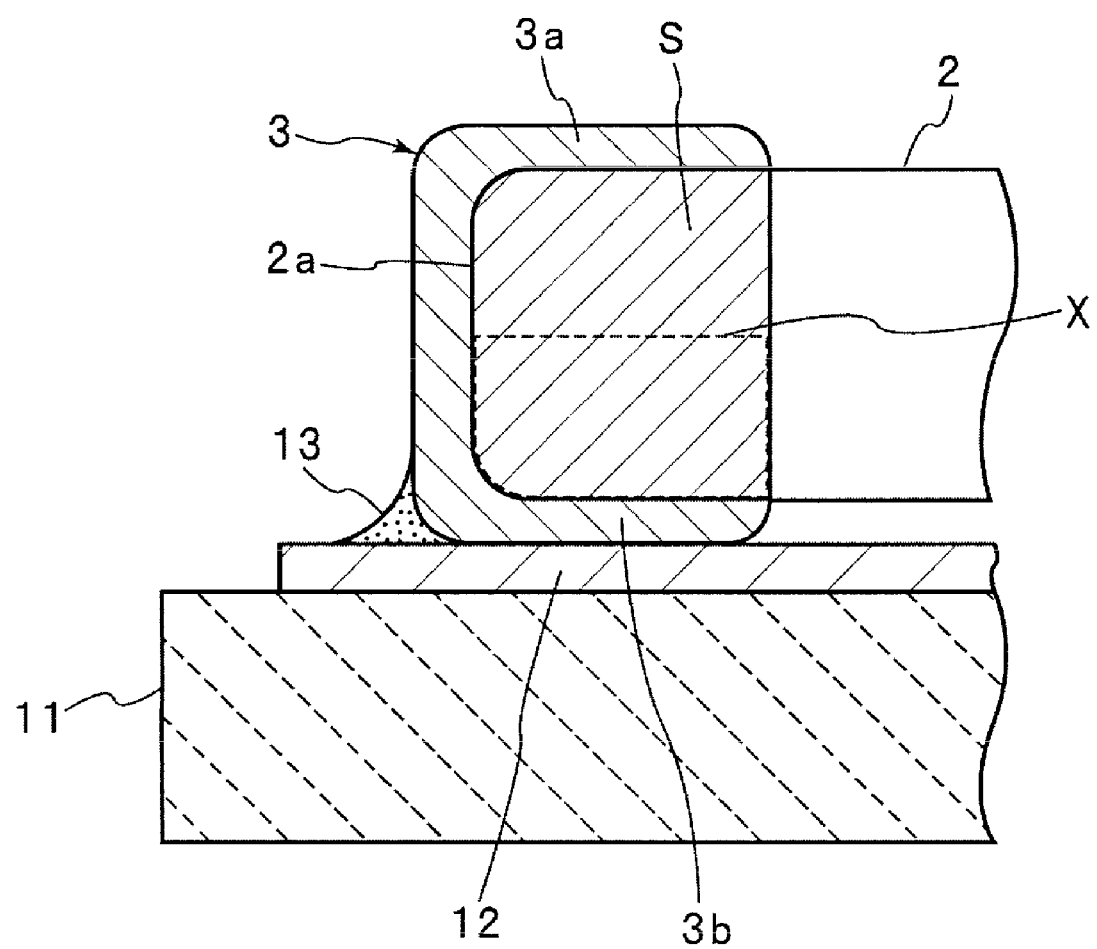
FIG. 5 is a partial front cross-sectional and broken view illustrating the definition of a first area and a second area in the multilayer capacitor according to the preferred embodiment of the present invention.

In contrast, according to the present preferred embodiment, the deformation of the multilayer capacitor 1 due to such electrostriction is suppressed, thus inhibiting a sound caused by the substrate vibration from being produced and damage to the mounting portions. Specifically, as schematically shown in a partial front cross-sectional and broken view in FIG. 5, the multilayer capacitor 1 is mounted on an electrode land 12 on a substrate 11 with solder 13. The portion towards the first external electrode 3 is shown in FIG. 5 and the portion towards the second external electrode 4 is not shown. The portion toward the second external electrode 4 is configured in a manner similar to that of the portion toward the first external electrode 3.

In the capacitor body 2, a portion of the capacitor body sandwiched between the first wraparound portion 3a of the first external electrode 3 and the second wraparound portion 3b thereof, that is, a portion of the capacitor body hatched in FIG. 5 is defined as a first area S. In this case, the first area S expands from the end of the first wraparound portion 3a to the end of the second wraparound portion 3b through the end surface 2a. The electrostatic capacitance can be increased as the volume proportion of the effective layers is increased in the first area S sandwiched between the wraparound portions 3a and 3b. Accordingly, according to the present preferred embodiment, the volume proportion of the effective layers in the first area S is set to at least about 10%. Similarly, the volume proportion of the effective layers in a third area toward the second external electrode 4 is also set to at least about 10% to increase the capacitance of the multilayer capacitor 1.

Referring to FIG. 5, it is also assumed that the lower half of the first area S toward the lower surface 2b, which is the other main surface, is defined as a second area X. The second area X corresponds to a portion of the capacitor body surrounded by a broken line in FIG. 5. According to the present preferred embodiment, the volume proportion of the effective layers in the second area X is set to about 15% or less. Although a higher volume proportion of the effective layers is desirable in the second area X to increase the capacitance of the multilayer capacitor 1, setting the volume proportion to about 15% or less suppresses the deformation of the capacitor body 2 attributed to the electrostriction at the side of the lower surface 2b. As a result, the above-described settings inhibit the displacement caused by the bending of the substrate 11 and the vibration of the substrate 11 and damage to the mounting portions.

At the side of the second external electrode 4, the volume proportion of the effective layers in a fourth area occupying the lower half of the third area is set to about 15% or less.

The inventor of the present invention has found that setting the volume proportion of the effective layers in the first and third areas to at least about 10% and setting the volume proportion of the effective layers in the second and fourth areas to about 15% or less in the multilayer capacitor 1 having a size of about 1.6×0.8(width)×about 0.8(height) enables the capacitance of the multilayer capacitor 1 to be increased. The inventor of the present invention has found that the above settings inhibit the vibration and/or deformation of the substrate during the driving, the production of the sound, and damage to the mounting portions.

As in Japanese Unexamined Patent Application Publication No. 2000-124057, Japanese Unexamined Patent Application Publication No. 6-163311, Japanese Unexamined Patent Application Publication No. 8-181033, Japanese Unexamined Patent Application Publication No. 11-150037, and Japanese Unexamined Utility Model Registration Application Publication No. 7-32936 mentioned above, the sizes of the internal electrodes, the thicknesses of the dielectric layers, the sizes of the capacitor body, and other characteristics have been adjusted in order to prevent occurrences of cracks, for example, as the temperature of the multilayer capacitor varies. However, the problems caused by the deformation of the capacitor body attributed to the electrostriction have not been recognized. The multilayer capacitor 1 according to the present preferred embodiment is provided to resolve the problems caused by the deformation of the capacitor body attributed to the electrostriction during the driving of the multilayer capacitor, which have not been recognized.

With the multilayer capacitor 1 according to the present preferred embodiment, the sound caused by the substrate vibration and the damage to the mounting portions are suppressed by limiting the volume proportion of the effective layers in the first and third areas and the volume proportion of the effective layers in the second and fourth areas to the above ranges.

The multilayer capacitor having a length L=about 1.6 mm, a width W=about 0.8 mm, and a thickness T=about 0.8 mm, that is, the multilayer capacitor having a size of about 1.6 mm×about 0.8 mm×about 0.8 mm has a manufacturing tolerance in dimension of ±0.1 mm. Accordingly, in the case of the multilayer capacitor having a size of about 1.6±0.1 mm long by about 0.8±0.1 mm wide by about 0.8±0.1 mm thick, it is possible to suppress the deformation and/or vibration of the substrate attributed to the electrostriction and to suppress the damage to the mounting portions by setting the volume proportion of the effective layers in the first and third areas to at least about 10% and setting the volume proportion of the effective layers in the second and fourth areas to about 15% or less, as in the present preferred embodiment.

Although the multilayer capacitor having a size of about 1.6 mm long×about 0.8 mm wide×about 0.8 mm thick is described in the present preferred embodiment, it is possible to suppress the deformation of the substrate attributed to the electrostriction and to suppress an occurrence of the sound and the damage to the mounting portions, as in the present preferred embodiment, by setting the volume proportion of the effective layers in the first and third areas to at least about 20% and setting the volume proportion of the effective layers in the second and fourth areas to about 35% or less in so-called "2012", "3216", and "3225" sizes, as shown in Table 1. The "2012" size means a length L=about 2.0 mm, a width W=about 1.25 mm, and a thickness T=about 1.25 mm and the manufacturing tolerance of the dimensions is ±0.1 mm.

The "3216" size means the size of a multilayer capacitor having a length L=about 3.2 mm, a width W=about 1.6 mm, and a thickness T=about 1.6 mm and the manufacturing tolerance of the dimensions is ±0.15 mm.

The "3225" size means the size of a multilayer capacitor having a length L=about 3.2 mm, a width W=about 2.5 mm, and a thickness T=about 2.5 mm. The manufacturing tolerances of the length L, the width W, and the thickness T are ±0.3 mm, ±0.2 mm, and ±0.2 mm, respectively.

In a multilayer capacitor having a size of about 1.0 mm long×about 0.5 mm wide×about 0.5 mm thick, that is, in a multilayer capacitor having a so-called "1005" size, it is possible to suppress the deformation of the substrate attributed to the electrostriction and to suppress an occurrence of the sound and the damage to the mounting portions, as in the present preferred embodiment, by setting the volume proportion of the effective layers in the first and third areas to at least about 10% and setting the volume proportion of the effective layers in the second and fourth areas to about 10% or less. The manufacturing tolerance of the dimensions in the multilayer capacitor of the "1005" size is ±0.05 mm.

TABLE 1

| Chip size | Volume proportion of effective layers in area S (%) | Volume proportion of effective layers in area X (%) |
| --- | --- | --- |
| 1608 | 10% or more | 15% or less |
| 2012 | 20% or more | 35% or less |
| 3216 | 20% or more | 35% or less |
| 3225 | 20% or more | 35% or less |
| 1005 | 10% or more | 10% or less |

Also at the "2012" to "3225" sizes and the "1005" size, with the multilayer capacitor having a size within the range of the manufacturing tolerances, it is possible to suppress the deformation and/or vibration of the substrate attributed to the electrostriction and to suppress the damage to the mounting portions, as in the present preferred embodiment.

The portion in which the internal electrodes 5i to 5l in the first and second internal electrode groups are overlapped with each other is provided near the central portion in the direction connecting the end surface 2a and the second end surface 2b in the second and the fourth areas in order to reduce the volume proportion of the effective layers in the second and fourth areas in the present preferred embodiment. In other words, the internal electrodes 5i to 5l are not overlapped with each other with the dielectric layers sandwiched therebetween in the second and fourth areas. However, the configuration adopted to reduce the volume proportion of the effective layers in the second and fourth areas is not limited to the one according to the present preferred embodiment. Modifications of the configuration adopted to reduce the volume proportion of the effective layers in the second and fourth areas are shown in FIGS. 6A to 8B.

Figure 6A:
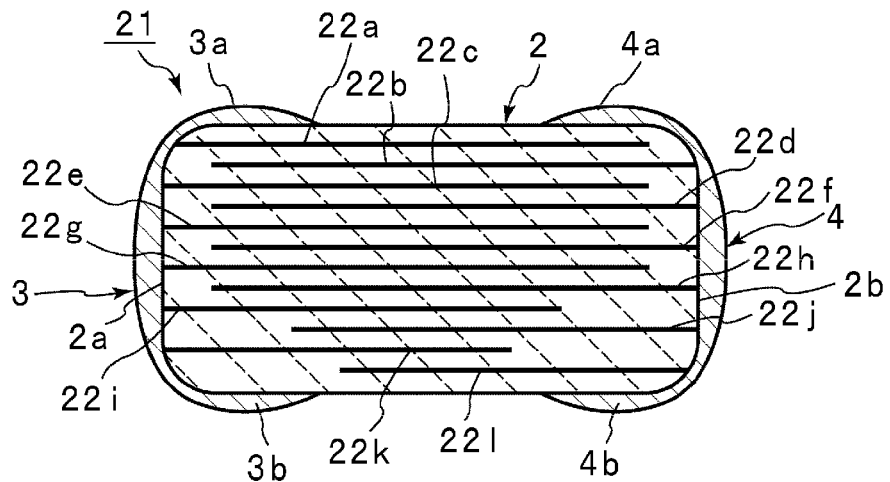
FIGS. 6A, 6B, and 6C are front cross-sectional views showing modifications of the multilayer capacitor according to preferred embodiments of the present invention.

In a multilayer capacitor 21 according to a modification shown in FIG. 6A, a first internal electrode group including multiple internal electrodes 22a, 22c, 22e, 22g, 22i, and 22k and a second internal electrode group including multiple internal electrodes 22b, 22d, 22f, 22h, 22j, and 22l are arranged in the capacitor body 2 of the multilayer capacitor 21. Of the first and second internal electrode groups, the internal electrode 22a, 22c, 22e, and 22g in the first internal electrode group are overlapped with the internal electrodes 22b, 22d, 22f, and 22h in the second internal electrode group also in the first and third areas. In contrast, the internal electrode 22i to 22l are provided such that the areas of the effective layers are reduced in the direction from the internal electrode 22i to the internal electrode 22l, that is, toward the lower surface 2d, the other main surface, of the capacitor body 2. This configuration allows the volume proportion of the effective layers in the second and fourth areas to be reduced.

Figure 6B:
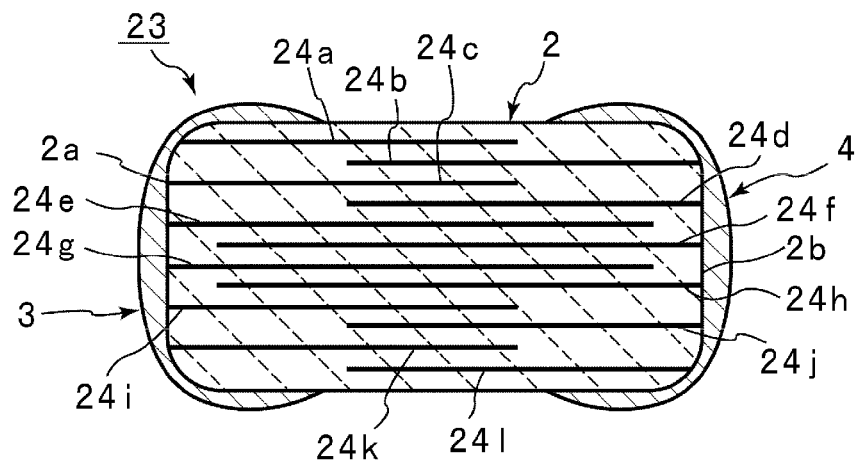

In a multilayer capacitor 23 according to a modification shown in FIG. 6B, the effective layers for internal electrodes 24e and 24g in a first internal electrode group and internal electrodes 24f and 24h in a second internal electrode group extend to the first and third areas. The internal electrodes 24e to 24h are located in the central portion of the capacitor body 2 in the thickness direction. In contrast, a portion in which multiple internal electrodes 24a to 24d above the internal electrode 24e are overlapped with each other and a portion in which multiple internal electrodes 24i to 24l below the internal electrode 24h are overlapped with each other do not extend to the first and third areas. Accordingly, the multilayer capacitor 23 may be mounted right side up or upside down in this modification.

A multilayer capacitor 25 according to a modification shown in FIG. 7A is configured in the same manner as in the multilayer capacitor 23 except that a portion in which internal electrode 26a to 26d are overlapped with each other is reduced in area toward the upper surface 2c and a portion in which internal electrode 26i to 26l are overlapped with each other is reduced in area toward the lower surface 2d. Accordingly, the multilayer capacitor 25 may be mounted right side up or upside down in this modification.

In a multilayer capacitor 27 shown in FIG. 7B, internal electrodes 28a to 28h are arranged so as to overlap each other also in the first and second areas. In other words, the internal electrode 28a to 28h at the side of the upper surface 2c are arranged so as to provide larger effective layers.

In contrast, internal electrode 28i to 28l are not overlapped with each other in the first and second areas, as in the first preferred embodiment, and are overlapped with each other in the middle of the first and second areas. According to this modification, dummy electrodes 29a to 29d are provided near the ends of the internal electrodes 28i to 28l. The multilayer capacitor 27 is configured in the same manner as the multilayer capacitor 1 except that the dummy electrodes 29a to 29d are provided.

Figure 8A:
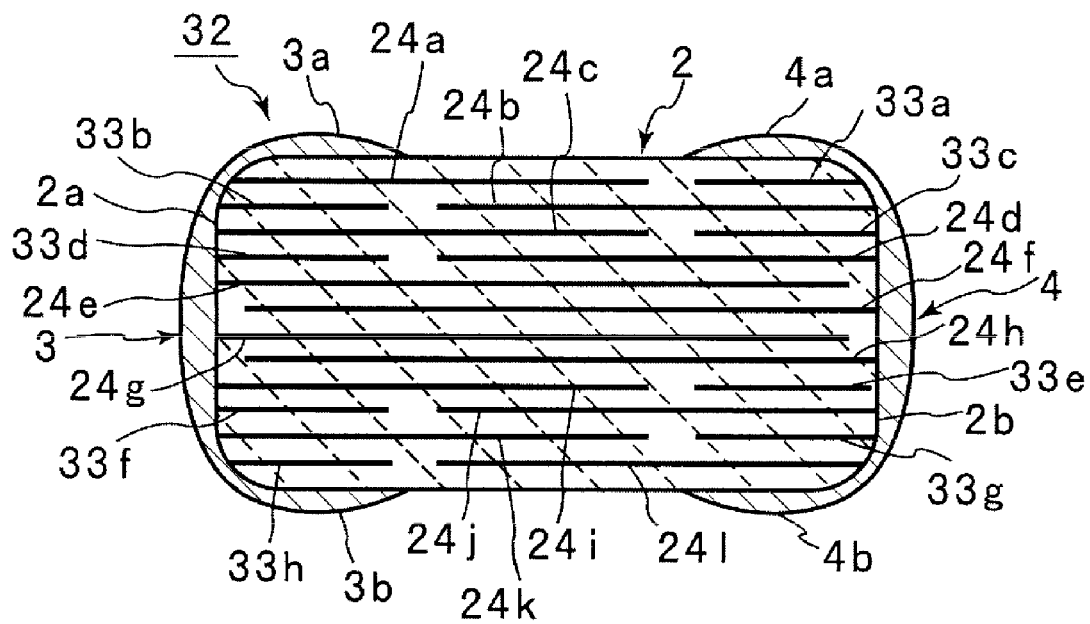
FIGS. 8A and 8B are front cross-sectional views illustrating other modifications of the multilayer capacitor according to preferred embodiments of the present invention.
Figure 8B:
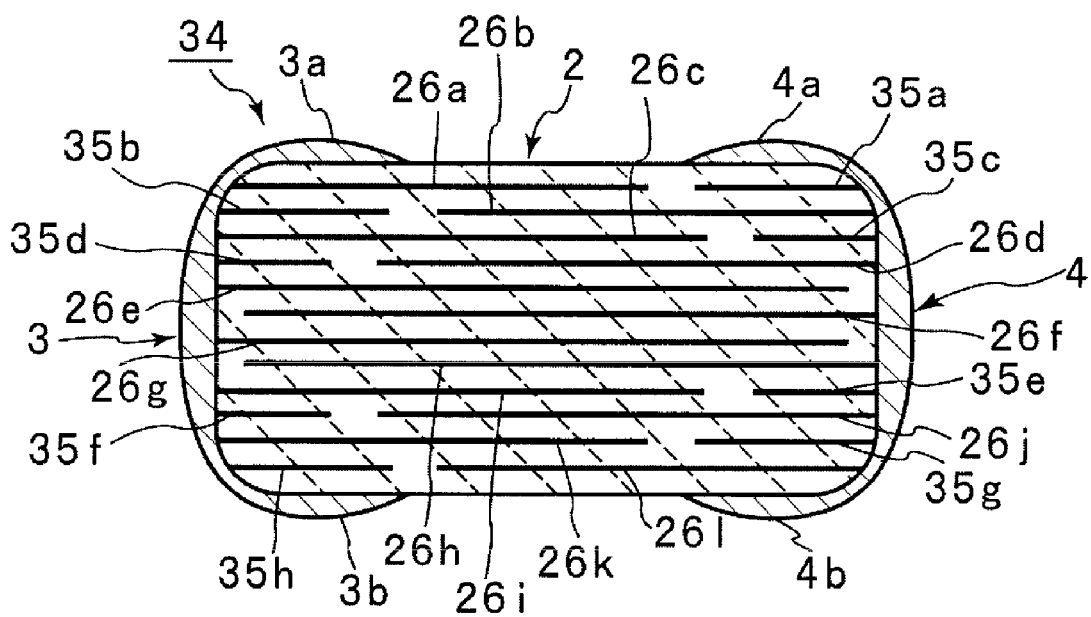

A multilayer capacitor 30 shown in FIG. 7C is configured such that dummy electrodes 31a to 31d are added to the configuration of the multilayer capacitor 21 shown in FIG. 6A. A multilayer capacitor 32 shown in FIG. 8A is configured such that dummy electrodes 33a to 33h are added to the configuration of the multilayer capacitor 23 shown in FIG. 6B. A multilayer capacitor 34 shown in FIG. 8B is configured such that dummy electrodes 35a to 35h are added to the configuration of the multilayer capacitor 25 shown in FIG. 7A. When the volume proportions of the effective layers in the second and fourth areas are reduced as in the examples shown in FIGS. 7C, 8A, and 8B, the appropriate provision of the dummy electrodes enables the multilayer capacitor according to the present invention to be manufactured without increasing the number of the patterns of the internal electrodes on the motherboard.

Specific experimental examples will now be described.

Experimental Example 1

A multilayer capacitor was manufactured with the following specifications by using a dielectric material including $BaTiO_3$ as the main ingredient, to which $Gd_2O_3$ was added as a rare earth element oxide. The external size of each capacitor body including the external electrodes was set to about 1.6 mm long (L), about 0.8 mm wide (W), and about 0.8 mm thick (T). The thickness of each dielectric layer sandwiched between the internal electrodes was set to about 1.8 μm, the thickness of each internal electrode was set to about 1.0 μm, and the number of effective layers was set to 230. The internal electrodes were made of Ni. The external electrodes were manufactured by plating a thick electrode layer made of Cu with Ni and Sn.

The thickness of each dielectric layer above or below the portion in which the effective layers were provided was set to about 70 μm, the thickness of each external electrode on the end surface was set to about 60 μm, and the thickness of the external electrode on each wraparound portion was set to about 20 μm. The lengthwise dimension of each wraparound portion, that is, the distance between the end of each wraparound portion and the corresponding end surface of the capacitor body was set to about 0.4 mm.

The volume proportion of the effective layers in the multilayer capacitor was varied to produce different types of multilayer capacitors. The configuration of the portion in which the layered internal electrodes were overlapped with each other was varied to vary the volume proportion of the effective layers. Current was applied to the multilayer capacitors of multiple types at a frequency of about 1 KHz and at a voltage of about 0.5 V to measure the electrostatic capacitances. The multilayer capacitors were mounted on mounting substrates in the following manner to measure the pressure levels of the sounds caused by the substrate vibration during the driving of the multilayer capacitors.

Measurement of Pressure Level of Sound Caused by Substrate Vibration.

Figure 9:
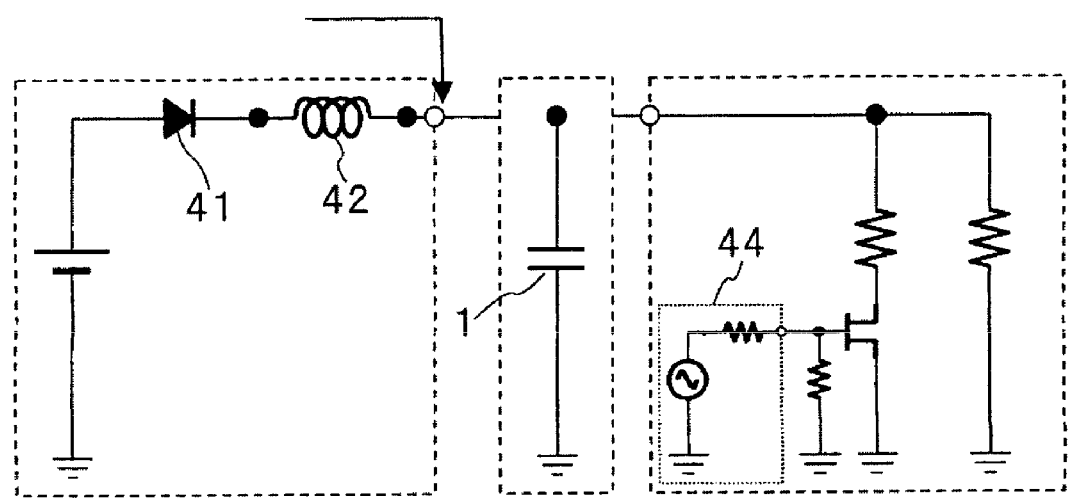
FIG. 9 is a block diagram of a circuit used to measure the pressure levels of sounds caused by the substrate vibration in experiment examples.

The multilayer capacitors mounted on glass epoxy substrates each having a size of about 40 mm×about 100 mm×about 0.5 mm (thickness) with solder were driven by using a circuit shown in a block diagram in FIG. 9 to measure the pressure levels of the sound caused by the substrate vibration. Specifically, as shown in FIG. 9, power was applied from a power supply Vdc to a multilayer capacitor 1 through a diode 41 and an inductor 42. In this case, the power supply voltage was set to about 1.5 V and a current in a range from about 0.4 A to about 0.8 A was applied.

The pressure levels of the sound caused by the substrate vibration were measured using a superdirective microphone (manufactured by ALC Microwave Inc., Portion number: KM-358) and were analyzed using a generator 44 shown in FIG. 9 to measure the sound pressure levels. The measurement results are shown in Table 2.

TABLE 2

| Experiment No. | Volume proportion of effective layers in area S (%) | Volume proportion of effective layers in area X (%) | Electrostatic capacitance ($\mu$F) | Sound pressure level (dB) |
| --- | --- | --- | --- | --- |
| Condition 1 | 5 | 5 | 0.98 | 27 |
| Condition 2 | 10 | 10 | 1.02 | 28 |
| Condition 3 | 15 | 15 | 1.06 | 30 |
| Condition 4 | 20 | 5 | 1.1 | 26 |
| Condition 5 | 20 | 10 | 1.11 | 28 |
| Condition 6 | 20 | 15 | 1.08 | 29 |
| Condition 7 | 20 | 20 | 1.1 | 33 |
| Condition 8 | 25 | 10 | 1.14 | 28 |
| Condition 9 | 25 | 15 | 1.13 | 30 |
| Condition 10 | 25 | 20 | 1.14 | 32 |
| Condition 11 | 25 | 25 | 1.15 | 35 |
| Condition 12 | 30 | 30 | 1.19 | 37 |

Table 2 shows that it is necessary to set the volume proportions of the effective layers in the first and third areas to at least about 10% and to set the volume proportion of the effective layers in the second and fourth areas to about 15% or less in order to achieve a capacitance of about 1 $\mu$F or greater and to reduce the sound pressure level to a value not greater than about 30 dB in the "1608" size.

Experimental Examples 2 to 5

Multilayer capacitors were manufactured in the following specifications in experimental examples 2 to 5 in the same manner as in experimental example 1. The volume proportions of the effective layers in the first and third areas and in the second and fourth areas were varied in the manufactured multilayer capacitors in the same manner as in experimental example 1 to measure the electrostatic capacitances and the pressure levels of the sound caused by the substrate vibration. The measurement results are shown in Tables 3 to 6.

Specifications of Multilayer Capacitor in Experiment Example 2:

The size of the capacitor body including the external electrodes was set to about 2.0 mm long (L) by about 1.25 mm wide (W) by about 1.25 mm thick (T). The thickness of each dielectric layer sandwiched between the internal electrodes was set to about 1.8 $\mu$m, the thickness of each internal electrode was set to about 1.0 $\mu$m, and the number of effective layers was set to 380. The thickness of each dielectric layers above or below the portion in which the effective layers were provided was set to about 80 $\mu$m, the thickness of each external electrode on the end surface was set to about 60 $\mu$m, and the thickness of each wraparound portion was set to about 30 $\mu$m. The distance between the end of each wraparound portion and the corresponding end surface of the capacitor body was set to about 0.5 mm. The dielectric layers, the internal electrodes, and the external electrodes were made of the same material as in experimental example 1.

Specifications of Multilayer Capacitor in Experiment Example 3:

The size of the capacitor body including the external electrodes was set to 3.2 mm long (L) by 1.6 mm wide (W) by 1.6 mm thick (T). The thickness of each dielectric layer sandwiched between the internal electrodes was set to 1.8 $\mu$m, the thickness of each internal electrode was set to 1.0 $\mu$m, and the number of effective layers was set to 500. The thickness of each dielectric layers above or below the portion in which the effective layers were provided was set to 100 $\mu$m, the thickness of each external electrode on the end surface was set to 60 $\mu$m, and the thickness of each wraparound portion was set to 40 $\mu$m. The distance between the end of each wraparound portion and the corresponding end surface of the capacitor body was set to 0.6 mm. The dielectric layers, the internal electrodes, and the external electrodes were made of the same material as in experimental example 1.

Specifications of Multilayer Capacitor in Experiment Example 4:

The size of the capacitor body including the external electrodes was set to about 3.2 mm long (L) by about 2.5 mm wide (W) by about 2.5 mm thick (T). The thickness of each dielectric layer sandwiched between the internal electrodes was set to about 1.8 $\mu$m, the thickness of each internal electrode was set to about 1.0 $\mu$m, and the number of effective layers was set to 800. The thickness of each dielectric layers above or below the portion in which the effective layers were provided was set to about 100 $\mu$m, the thickness of each external electrode on the end surface was set to about 100 $\mu$m, and the thickness of each wraparound portion was set to about 40 $\mu$m. The distance between the end of each wraparound portion and the corresponding end surface of the capacitor body was set to about 0.6 mm. The dielectric layers, the internal electrodes, and the external electrodes were made of the same material as in experimental example 1.

Specifications of Multilayer Capacitor in Experiment Example 5:

The size of the capacitor body including the external electrodes was set to about 1.0 mm long (L) by about 0.5 mm wide (W) by about 0.5 mm thick (T). The thickness of each dielectric layer sandwiched between the internal electrodes was set to about 1.8 $\mu$m, the thickness of each internal electrode was set to about 1.0 $\mu$m, and the number of effective layers was set to 120. The thickness of each dielectric layers above or below the portion in which the effective layers were provided was set to about 60 $\mu$m, the thickness of each external electrode on the end surface was set to about 30 $\mu$m, and the thickness of each wraparound portion was set to about 10 $\mu$m. The distance between the end of each wraparound portion and the corresponding end surface of the capacitor body was set to about 0.3 mm. The dielectric layers, the internal electrodes, and the external electrodes were made of the same material as in experimental example 1.

TABLE 3

| Experiment No. | Volume proportion of effective layers in area S (%) | Volume proportion of effective layers in area X (%) | Electrostatic capacitance (µF) | Sound pressure level (dB) |
|---|---|---|---|---|
| Condition 1 | 15 | 15 | 2.11 | 25 |
| Condition 2 | 20 | 20 | 2.2 | 26 |
| Condition 3 | 25 | 25 | 2.29 | 27 |
| Condition 4 | 30 | 30 | 2.35 | 27 |
| Condition 5 | 35 | 35 | 2.44 | 29 |
| Condition 6 | 40 | 30 | 2.51 | 28 |
| Condition 7 | 40 | 35 | 2.53 | 30 |
| Condition 8 | 40 | 40 | 2.52 | 33 |
| Condition 9 | 45 | 30 | 2.59 | 28 |
| Condition 10 | 45 | 35 | 2.58 | 30 |
| Condition 11 | 45 | 40 | 2.6 | 36 |
| Condition 12 | 45 | 45 | 2.59 | 40 |

TABLE 4

| Experiment No. | Volume proportion of effective layers in area S (%) | Volume proportion of effective layers in area X (%) | Electrostatic capacitance (µF) | Sound pressure level (dB) |
|---|---|---|---|---|
| Condition 1 | 15 | 15 | 9.8 | 25 |
| Condition 2 | 20 | 20 | 10.1 | 26 |
| Condition 3 | 25 | 25 | 10.4 | 27 |
| Condition 4 | 30 | 30 | 10.6 | 29 |
| Condition 5 | 35 | 35 | 10.9 | 30 |
| Condition 6 | 40 | 30 | 11.1 | 28 |
| Condition 7 | 40 | 35 | 11.3 | 30 |
| Condition 8 | 40 | 40 | 11.2 | 34 |
| Condition 9 | 45 | 30 | 11.6 | 29 |
| Condition 10 | 45 | 35 | 11.5 | 30 |
| Condition 11 | 45 | 40 | 11.4 | 35 |
| Condition 12 | 45 | 45 | 11.4 | 40 |

TABLE 5

| Experiment No. | Volume proportion of effective layers in area S (%) | Volume proportion of effective layers in area X (%) | Electrostatic capacitance (µF) | Sound pressure level (dB) |
|---|---|---|---|---|
| Condition 1 | 15 | 15 | 21.6 | 25 |
| Condition 2 | 20 | 20 | 22.2 | 25 |
| Condition 3 | 25 | 25 | 22.7 | 26 |
| Condition 4 | 30 | 30 | 23.1 | 28 |
| Condition 5 | 35 | 35 | 23.5 | 30 |
| Condition 6 | 40 | 30 | 24 | 28 |
| Condition 7 | 40 | 35 | 24.1 | 29 |
| Condition 8 | 40 | 40 | 23.9 | 34 |
| Condition 9 | 45 | 30 | 24.5 | 29 |
| Condition 10 | 45 | 35 | 24.4 | 30 |
| Condition 11 | 45 | 40 | 24.4 | 36 |
| Condition 12 | 45 | 45 | 24.6 | 42 |

TABLE 6

| Experiment No. | Volume proportion of effective layers in area S (%) | Volume proportion of effective layers in area X (%) | Electrostatic capacitance (µF) | Sound pressure level (dB) |
|---|---|---|---|---|
| Condition 1 | 5 | 5 | 0.44 | 26 |
| Condition 2 | 10 | 10 | 0.47 | 27 |
| Condition 3 | 15 | 15 | 0.48 | 30 |
| Condition 4 | 20 | 5 | 0.49 | 27 |
| Condition 5 | 20 | 10 | 0.5 | 28 |
| Condition 6 | 20 | 15 | 0.51 | 32 |
| Condition 7 | 20 | 20 | 0.53 | 31 |
| Condition 8 | 25 | 10 | 0.52 | 29 |
| Condition 9 | 25 | 15 | 0.54 | 31 |
| Condition 10 | 25 | 20 | 0.53 | 33 |
| Condition 11 | 25 | 25 | 0.55 | 32 |
| Condition 12 | 30 | 30 | 0.57 | 35 |

Table 3 shows that it is necessary to set the volume proportions of the effective layers in the first and third areas to at least about 20% and to set the volume proportion of the effective layers in the second and fourth areas to about 35% or less in order to achieve a capacitance of about 2.2 µF or greater and to reduce the pressure level of the sound caused by the substrate vibration to a value not greater than about 30 dB in the so-called "2012" size.

Table 4 shows that it is necessary to set the volume proportions of the effective layers in the first and third areas to at least about 20% and to set the volume proportion of the effective layers in the second and fourth areas to about 35% or less in order to achieve a capacitance of about 10 µF or greater and to reduce the pressure level of the sound caused by the substrate vibration to a value not greater than about 30 dB in the so-called "3216" size.

Table 5 shows that it is necessary to set the volume proportions of the effective layers in the first and third areas to at least about 20% and to set the volume proportion of the effective layers in the second and fourth areas to about 35% or less in order to achieve a capacitance of about 22 µF or higher and to reduce the pressure level of the sound caused by the substrate vibration to a value not greater than about 30 dB in the so-called "3225" size.

Table 6 shows that it is necessary to set the volume proportions of the effective layers in the first and third areas to at least about 10% and to set the volume proportion of the effective layers in the second and fourth areas to about 10% or less in order to achieve a capacitance of about 0.47 µF or greater and to reduce the pressure level of the sound caused by the substrate vibration to a value not greater than about 29 dB in the so-called "1005" size.

In the multilayer capacitor 23 shown in FIG. 6B described above, the effective layers in the portion in which the internal electrodes 24f to 24h overlap each other, that is, in the central portion of the capacitor body in the direction connecting the first main surface and the second main surface extend to the first and third areas. In contrast, the effective layers in the portion in which multiple internal electrodes 24i to 24l below the internal electrode 24h are overlapped with each other do not extend to the first and third areas. A portion below the internal electrode 24h, that is, a portion toward the other main surface of the capacitor body is defined as an effective-layer excluded portion in which the internal electrodes are not overlapped with each other in the first and third areas. The effective layers are excluded in an area surrounded by an alternate long and short dash line V in FIG. 6C, which is in contrast with the case in which the internal electrodes in the first and second internal electrode groups are overlapped with each other, as in the internal electrodes 24e to 24h, and the effective layers extend to the first and third areas, that is, to the one side and the other side of the capacitor body.

Figure 6C:
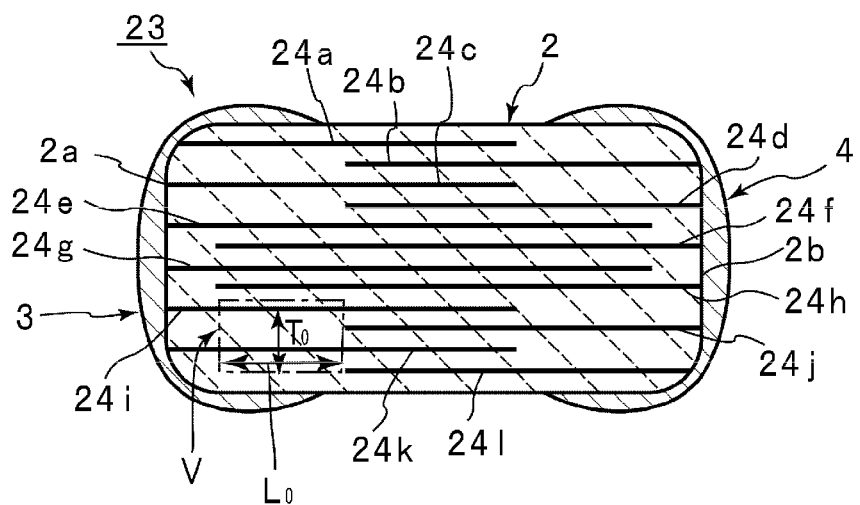

In view of the portion surrounded by the alternate long and short dash line V from the cross section shown in FIG. 6C, that is, from the cross section that includes the lengthwise direction of the capacitor body and that is substantially perpendicular to the internal electrodes 24a to 24l, it is preferable that a ratio $T_0/L_0$ be in a range from about 0.5 to about 1.5, where "$L_0$" denotes the lengthwise dimension of the portion surrounded by the alternate long and short dash line V and "$T_0$" denotes the dimension thereof in the thickness direction of the capacitor body. Setting the ratio $T_0/L_0$ to a value within the above-described range effectively suppresses an occurrence of the sound involved in the deformation during the driving of the multilayer capacitor and reliably suppresses an occurrence of the sound even when the capacitance of the multilayer capacitor is increased. The suppression is due to the following reasons. Specifically, the increase in area of the gap portions in the second and fourth areas, particularly in the lower area of the capacitor body, as in FIG. 6B, suppresses the sound caused by the substrate vibration. This is because the provision of the gap portions, for example, immediately under the wraparound portions of the external electrode 3 reduces the shrinkage of the capacitor body in the thickness direction and the shrinkage of the surfaces in the widthwise direction and the lengthwise direction of the capacitor body to reduce the deformation shown by the double-dotted chain lines in FIG. 4. It is preferable that the gap portions be reduced in area as much as possible in order to increase the capacitance of the multilayer capacitor. Accordingly, for the suppression of the sound caused by the substrate vibration while increasing the capacitance of the multilayer capacitor, it is desirable to reduce the size of the gap portions in order to increase the capacitance of the multilayer capacitor while it is desirable to increase the size of the gap portions in order to suppress the sound caused by the substrate vibration.

The sound caused by the substrate vibration can be reliably suppressed when the ratio of the dimension $T_0$ in the thickness direction of the capacitor body with respect to the dimension $L_0$ in the lengthwise direction of the capacitor body in the portion surrounded by the alternate long and short dash line V, shown in FIG. 6C, is set to a value in the range from about 0.5 to about 1.5. In other words, the sound is primarily caused by the fact that the surface of the lower wraparound portion of, for example, the external electrode 3 is shifted in the horizontal direction due to the difference between the deformation of the capacitor body in the thickness direction in the effective layers and the deformation in the gap portions to bend the substrate. Consequently, the presence of the effective layers near the mounting surface has an advantageous effect on an occurrence of the sound caused by the substrate vibration.

Reducing the size of the gap portions and making the effective layers close to the wraparound portion of the external electrode toward the mounting surface increase the sound caused by the substrate vibration although the capacitance of the multilayer capacitor is increased in this case.

Accordingly, the "$T_0$" should be greater than the "$L_0$" ($T_0 > L_0$) in the effective-layer excluded portion in order to suppress the sound caused by the substrate vibration by reducing the deformation of the capacitor body in the thickness direction and the deformation of the gap portions. However, although the deformation of the capacitor body in the thickness direction is reduced when $T_0 > L_0$, it is necessary to decrease the "$L_0$" and to increase the proportions of the effective layers in the second and fourth areas described above in order to maintain the capacitance of the multilayer capacitor.

In contrast, when $T_0 < L_0$, the deformation of the capacitor body in the lengthwise direction is reduced but the deformation of the capacitor body in the thickness direction is increased. Accordingly, in view of the above description, the ratio $T_0/L_0$ is preferably set to a value in the range from about 0.5 to about 1.5. The sound caused by the substrate vibration can be increased when the ratio $T_0/L_0$ is less than about 0.5 while the capacitance of the multilayer capacitor can be reduced, although the sound caused by the substrate vibration is suppressed, when the ratio $T_0/L_0$ exceeds about 1.5.

The above description is verified on the basis of a specific experimental example.

Experimental Example 6

The multilayer capacitors of the "1005" size, the "1608" size, the "2012" size, the "3216" size, and the "3225" size were manufactured in the same manner as in experimental examples 1 to 5 described above. The volume proportion of the effective layers in the area S and the volume proportion of the effective layers in the area X were set to values shown in Table 7. In addition, as shown in Table 7, the ratio $T_0/L_0$ was varied and the multilayer capacitors were manufactured at the ratios $T_0/L_0$ shown as conditions 1 to 5 for the above sizes. Then, the capacitances of the multilayer capacitors and the pressure levels of the sounds caused by the substrate vibration were evaluated in the same manner as in experimental examples 1 to 5. The evaluation results are also shown in Table 7.

In the variation of the ratio $T_0/L_0$ in the multilayer capacitor of each size, the dimensions of the gap portions are adjusted so as to provide the same capacitance. Experimental example 6 is performed in the same manner as in experimental examples 1 to 5 in the other processes.

TABLE 7

| Size | Volume proportion of effective layers in area S (%) | Volume proportion of effective layers in area X (%) | | $T_0/L_0$ | Capacitance (µF) | Sound pressure level (dB) |
|---|---|---|---|---|---|---|
| 1005 | 10 | 10 | Condition 1 | No area | 0.47 | 27 |
|  |  |  | Condition 2 | 0.3 |  | 27 |
|  |  |  | Condition 3 | 0.5 |  | 25 |
|  |  |  | Condition 4 | 1.5 |  | 26 |
|  |  |  | Condition 5 | 1.8 |  | 28 |
| 1608 | 10 | 10 | Condition 1 | No area | 1.02 | 28 |
|  |  |  | Condition 2 | 0.3 |  | 27 |
|  |  |  | Condition 3 | 0.5 |  | 26 |
|  |  |  | Condition 4 | 1.5 |  | 26 |
|  |  |  | Condition 5 | 1.8 |  | 28 |
| 2012 | 20 | 20 | Condition 1 | No area | 2.2 | 26 |
|  |  |  | Condition 2 | 0.3 |  | 26 |
|  |  |  | Condition 3 | 0.5 |  | 24 |
|  |  |  | Condition 4 | 1.5 |  | 24 |
|  |  |  | Condition 5 | 1.8 |  | 27 |
| 3216 | 20 | 20 | Condition 1 | No area | 10.1 | 26 |
|  |  |  | Condition 2 | 0.3 |  | 26 |
|  |  |  | Condition 3 | 0.5 |  | 25 |
|  |  |  | Condition 4 | 1.5 |  | 25 |
|  |  |  | Condition 5 | 1.8 |  | 28 |
| 3225 | 20 | 20 | Condition 1 | No area | 22.2 | 25 |
|  |  |  | Condition 2 | 0.3 |  | 25 |
|  |  |  | Condition 3 | 0.5 |  | 24 |
|  |  |  | Condition 4 | 1.5 |  | 24 |
|  |  |  | Condition 5 | 1.8 |  | 27 |

Table 7 shows that, when the ratio $T_0/L_0$ is set to a value in the range from about 0.5 to about 1.5, all of the multilayer capacitors of the different sizes suppress the sounds caused by the substrate vibration while keeping the capacitances. As an alternative of the multilayer capacitor according to the present preferred embodiment, it is preferable that a width B be less than a width A where each of the first and second external electrodes has the width B and the multilayer capacitor has the width A. With the width B less than the width A, the pressure levels of the sounds caused by the substrate vibration can further effectively suppressed. This is described with reference to FIGS. 10A and 10B.

Figure 10A:
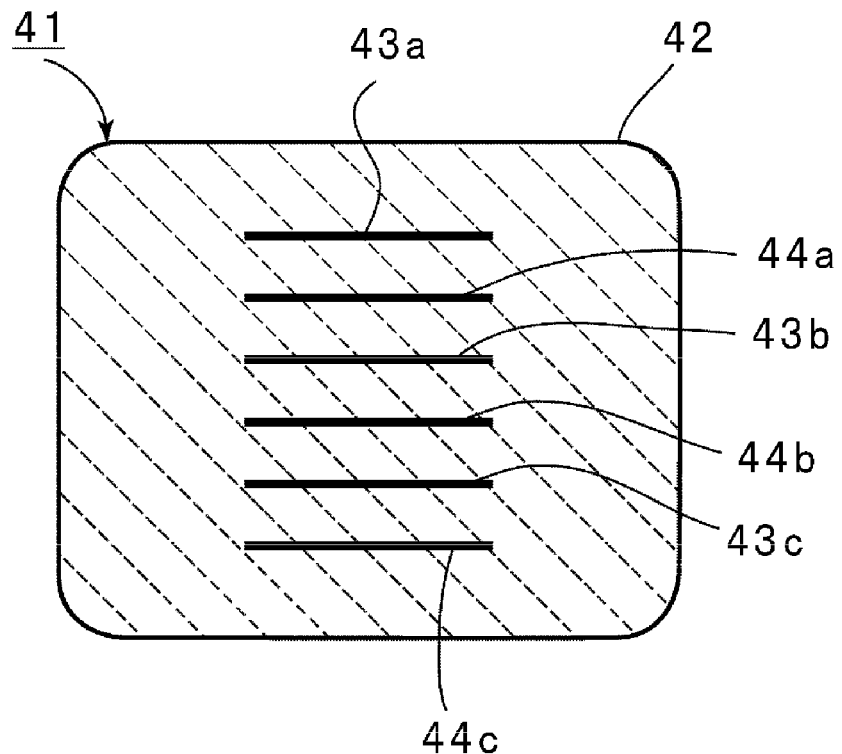
FIG. 10A is a cross-sectional view of a multilayer capacitor according to another preferred embodiment of the present invention and FIG. 10B is a side view viewed from a first end of the multilayer capacitor according to the preferred embodiment.
Figure 10B:
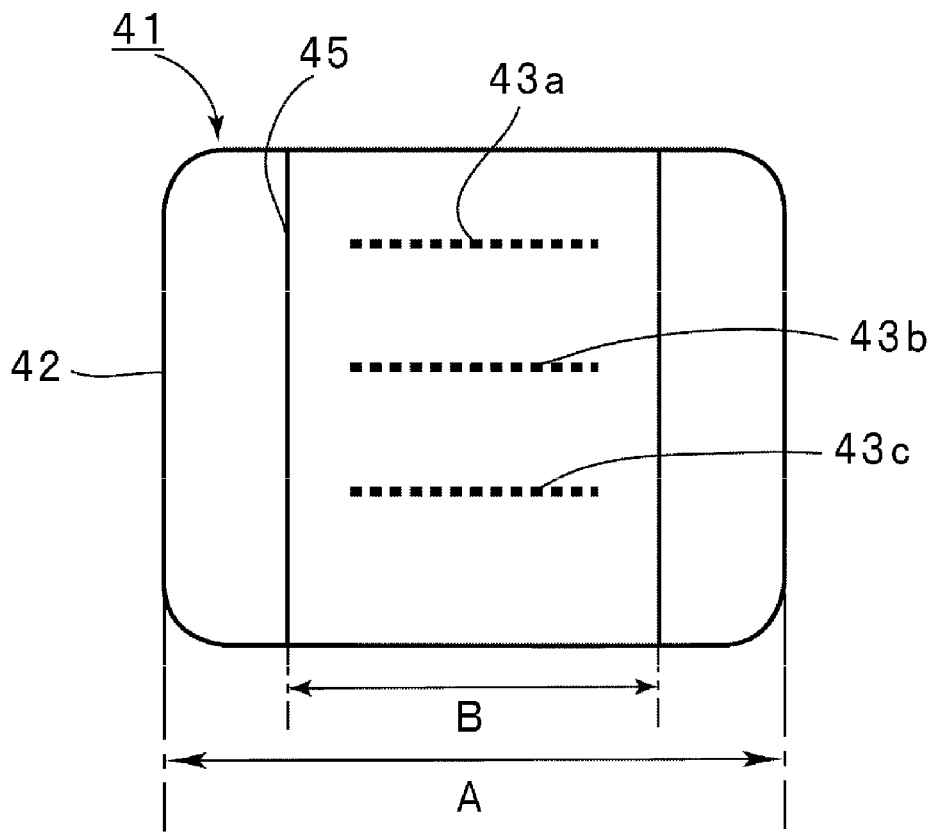
Figure 11:
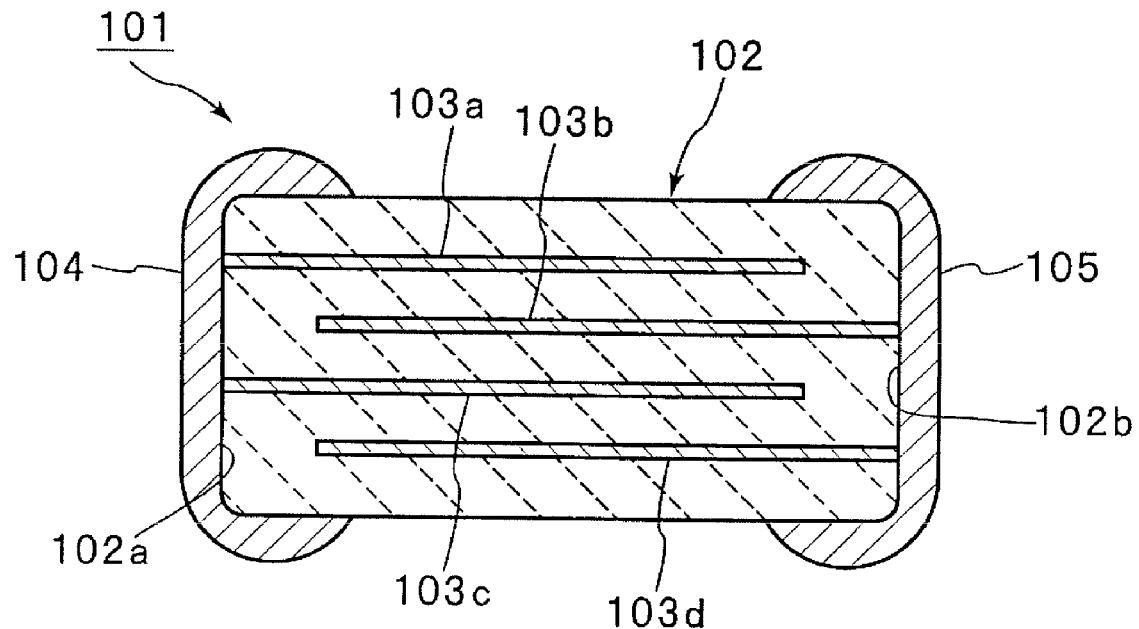
FIG. 11 is a front cross-sectional view showing an example of a multilayer capacitor in the related art.

FIGS. 10A and 10B illustrate a multilayer capacitor according to another preferred embodiment of the present invention. FIG. 10A is a cross-sectional view of a ceramic capacitor body. FIG. 10B is a side view showing a state in which a first external electrode is provided on one end of the ceramic capacitor body, viewed from the one end.

According to the present preferred embodiment, as shown in FIG. 10A, internal electrodes 43a to 43c in a first internal electrode group and internal electrodes 44a to 44c in a second internal electrode group are arranged in a capacitor body 42 so as to overlap each other with ceramic layers sandwiched therebetween. The internal electrodes 43a to 43c in the first internal electrode group are exposed at a first end of the capacitor body 42, as shown in FIG. 10B. A first external electrode 45 is provided on the first end of the capacitor body 42.

Although not shown, a second external electrode is provided on a second end of the capacitor body 42.

According to the present preferred embodiment, as in the multilayer capacitor 1 shown in FIG. 1, a multilayer capacitor 41 measures about 1.6±0.1 mm long by about 0.8±0.1 mm wide by about 0.8±0.1 mm thick. As in the multilayer capacitor according to the preferred embodiment shown in FIG. 1, the multilayer capacitor 41 is configured such that the volume proportion of the effective layers in the first area is at least about 10%, the volume proportion of the effective layers in the second area is about 15% or less, the volume proportion of the effective layers in the third area is at least about 10%, and the volume proportion of the effective layers in the four area is about 15% or less. The description of this configuration is omitted by incorporating the description of the multilayer capacitor shown in FIG. 1 herein.

Since the volume proportions of the effective layers in the first to fourth areas are set to values within the above specific range in the multilayer capacitor 41 according to the present preferred embodiment, as in the multilayer capacitor shown in FIG. 1, the pressure levels of the sounds caused by the substrate vibration are effectively suppressed.

In addition, the width B of the first and second external electrodes in the multilayer capacitor 41 is set to be less than the width A of the multilayer capacitor and, specifically, (B/A)×100(%) is set to a value not greater than about 92%. Accordingly, the sound caused by the substrate vibration is more effectively suppressed. This will now be specifically described.

The width B of the external electrode 45 means the dimension in the widthwise direction of the capacitor body 42. According to preferred embodiments of the present invention, the length of the capacitor body means the dimension in the direction connecting the one end of the capacitor body and the other end thereof, the height of the capacitor body means the dimension in the direction connecting the one main surface of the capacitor body and the other main surface thereof, and the width means the dimension in the direction substantially perpendicular to the directions of the length and the height.

For the following reasons, the sound caused by the substrate vibration is more effectively suppressed when the width B of the first external electrode 45 and the second external electrode (not shown) is set to be less than the width A of the capacitor body.

Specifically, the sound caused by the substrate vibration is a phenomenon induced by the vibration involved in the shrinkage and reversion of the ceramic capacitor body during the driving of the multilayer capacitor. This vibration is transmitted to the substrate to vibrate the substrate. The external electrode is provided on the path through which the vibration is transmitted. Accordingly, a smaller external electrode inhibits transmission of the vibration of the ceramic capacitor body to the substrate and, therefore, the sound caused by the substrate vibration is effectively suppressed.

According to the present preferred embodiment, the width B of the first external electrode 45 is set to be less than the width A of the multilayer capacitor 41 to suppress the transmission of the vibration to the substrate through the external electrode, thus suppressing the sound caused by the substrate vibration.

In order to reduce the size of the external electrode, not only the widthwise dimension of the external electrode but also the dimension of the external electrode along the height direction of the multilayer capacitor may be reduced. However, it is necessary to reliably connect the external electrode to the multiple internal electrodes exposed on the end surface of the ceramic capacitor body and, for this purpose, the external electrode 45 should have a strip shape extending in the height direction of the multilayer capacitor 41, as shown in FIG. 10B. Accordingly, it is preferable that the width B of the external electrode 45 be small in order to reliably produce the electrostatic capacitance and to suppress the sound caused by the substrate vibration. According to the present preferred embodiment, the width B of the external electrode 45 is set to be less than the width A of the multilayer capacitor 41. Preferably, the width B is set to a value not greater than about 92% of the width A.

It is desirable to make the width B smaller because the sound caused by the substrate vibration can be effectively suppressed. However, it is desirable that the width B of the external electrode 45 be greater than the dimension, along the widthwise direction of the capacitor body, of the internal electrodes 43a to 43c exposing on the end surface of the capacitor body 42 on which the external electrode is provided and that the external electrode 45 reliably cover the exposing internal electrode 43a to 43c. This enables the exposing internal electrodes to be reliably covered with the external electrode 45 to improve the moisture resistance. Preferably, the width B of the external electrode is set to a value at least about 1.1 times the dimension of the exposed portions of the internal electrodes along the widthwise direction in order to more reliably improve the moisture resistance. In this case, the exposed portions of the internal electrodes can be reliably covered with the external electrode even if the center of the portions of the internal electrodes exposed on the end surface of the capacitor body is slightly shifted from the center of the external electrode along the widthwise direction, thus reliably improving the moisture resistance.

The effective suppression of the sound caused by the substrate vibration in the multilayer capacitor according to the present preferred embodiment will now be verified on the basis of a specific experimental example.

Experimental Example 7

The multilayer capacitors of the "1005" size, the "1608" size, the "2012" size, the "3216" size, and the "3225" size were manufactured in the same manner as in experimental examples 1 to 6 described above. The volume proportion of the effective layers in the area S and the volume proportion of the effective layers in the area X were set to values shown in Table 8. In addition, as shown in Table 8, a ratio B/A of the width B of the external electrode with respect to the width A of the multilayer capacitor is varied and the multilayer capacitors were manufactured at the ratios (B/A)×100(%) shown as conditions 1 to 5 for the above sizes. Then, the capacitances of the multilayer capacitors and the pressure levels of the sounds caused by the substrate vibration were evaluated in the same manner as in experimental examples 1 to 5. The evaluation results are also shown in Table 8.

In the manufacturing of the multilayer capacitors of the different sizes under the conditions 1 to 5, a mask is fit such that the width B of the external electrode is set to a desired value and conductive paste for the external electrode formation is applied and fired.

TABLE 8

| Size | Volume proportion of effective layers in area S (%) | Volume proportion of effective layers in area X (%) | Ratio of width of external electrode (B/A) × 100% | Capacitance (μF) | Sound pressure level (dB) |
| --- | --- | --- | --- | --- | --- |
| 1005 | 10 | 10 | Condition 1 | 100 (normal) | 0.47 | 27 |
|  |  |  | Condition 2 | 95 |  | 27 |
|  |  |  | Condition 3 | 92 |  | 25 |
|  |  |  | Condition 4 | 75 |  | 26 |
|  |  |  | Condition 5 | 50 |  | 28 |
| 1608 | 10 | 10 | Condition 1 | 100 (normal) | 1.02 | 28 |
|  |  |  | Condition 2 | 95 |  | 27 |
|  |  |  | Condition 3 | 92 |  | 26 |
|  |  |  | Condition 4 | 75 |  | 26 |
|  |  |  | Condition 5 | 50 |  | 28 |
| 2012 | 20 | 20 | Condition 1 | 100 (normal) | 2.2 | 26 |
|  |  |  | Condition 2 | 95 |  | 26 |
|  |  |  | Condition 3 | 92 |  | 24 |
|  |  |  | Condition 4 | 75 |  | 24 |
|  |  |  | Condition 5 | 50 |  | 27 |
| 3216 | 20 | 20 | Condition 1 | 100 (normal) | 10.1 | 26 |
|  |  |  | Condition 2 | 95 |  | 26 |
|  |  |  | Condition 3 | 92 |  | 25 |
|  |  |  | Condition 4 | 75 |  | 25 |
|  |  |  | Condition 5 | 50 |  | 28 |
| 3225 | 20 | 20 | Condition 1 | 100 (normal) | 22.2 | 25 |
|  |  |  | Condition 2 | 95 |  | 25 |
|  |  |  | Condition 3 | 92 |  | 24 |
|  |  |  | Condition 4 | 75 |  | 24 |
|  |  |  | Condition 5 | 50 |  | 27 |

Table 8 shows that the pressure levels of the sounds caused by the substrate vibration are decreased as the (B/A)×100(%) is decreased from about 100% in all of the multilayer capacitors of different sizes. In particular, the pressure levels of the sounds caused by the substrate vibration can be reliably reduced when (B/A)×100(%) is about 92% or less.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A multilayer capacitor comprising:
   a capacitor body including a plurality of layered dielectric layers and having opposed end surfaces and opposed main surfaces;
   a first external electrode provided on one of the end surfaces of the capacitor body and including a first wraparound portion extending on one of the main surfaces of the capacitor body and a second wraparound portion extending on the other main surface thereof;
   a second external electrode provided on the other end surface of the capacitor body and including a third wraparound portion extending on the one main surface of the capacitor body and a fourth wraparound portion extending on the other main surface thereof;
   a first internal electrode group including internal electrodes provided between the dielectric layers and being connected to the first external electrode; and
   a second internal electrode group including internal electrodes provided between the dielectric layers and being connected to the second external electrode; wherein
   when a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 10%, the volume proportion of the effective layers in a second area occupying a lower half toward the other main surface in the first area is set to about 15% or less, the volume proportion of the effective layers in a third area sandwiched between the third wraparound portion and the fourth wraparound portion in the capacitor body is set to at least about 10%, and the volume proportion of the effective layers in a fourth area occupying a lower half toward the other main surface in the third area is set to about 15% or less; and
   external dimensions of the multilayer capacitor including the capacitor body, the first external electrode, and the second external electrode are about 1.6±0.1 mm in length by about 0.8±0.1 mm in width by about 0.8±0.1 mm in thickness.

2. The multilayer capacitor according to claim 1, wherein the first and second internal electrode groups are provided such that the effective layers extend to the first and third areas in the central portion in the thickness direction connecting the one main surface of the capacitor body and the other main surface thereof, viewed from a cross section that includes a straight line connecting the one end surface of the capacitor body and the other end surface thereof and that is perpendicular to the first and second internal electrode groups;
   when the portion in which the effective layers extend to the first and third areas is referred to as a central area, effective-layer excluded portions in which the effective layers do not extend to the first and third areas are provided in an area toward the other main surface with respect to the central portion; and
   $T_0/L_0$ is set to a value in a range from about 0.5 to about 1.5 where "$T_0$" denotes the dimension of each effective-layer excluded portion in the thickness direction and "L_o" denotes the dimension thereof in the direction connecting the one end of the capacitor body and the other end thereof.

3. The multilayer capacitor according to claim 1, wherein
a direction connecting the one end surface of the capacitor body and the other end surface thereof is a lengthwise direction, a direction connecting the one main surface of the capacitor body and the other main surface thereof is a height direction, and the direction substantially perpendicular to the lengthwise and height directions of the capacitor body is a widthwise direction; and
the dimension of the first and second external electrodes along the widthwise direction is made less that the width of the multilayer capacitor.

4. The multilayer capacitor according to claim 3, wherein the width of the external electrodes is about 92% or less of the width of the multilayer capacitor.

5. A multilayer capacitor comprising:
a capacitor body including a plurality of layered dielectric layers and having opposed end surfaces and opposed main surfaces;
a first external electrode provided on the one end of the capacitor body and including a first wraparound portion extending on one of the main surfaces of the capacitor body and a second wraparound portion extending on the other main surface thereof;
a second external electrode provided on the other end surface of the capacitor body and including a third wraparound portion extending on the one main surface of the capacitor body and a fourth wraparound portion extending on the other main surface thereof;
a first internal electrode group including internal electrodes provided between the dielectric layers and being connected to the first external electrode; and
a second internal electrode group including internal electrodes provided between the dielectric layers and being connected to the second external electrode; wherein
when a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 20%, the volume proportion of the effective layers in a second area occupying a lower half toward the other main surface in the first area is set to about 35% or less, the volume proportion of the effective layers in a third area sandwiched between the third wraparound portion and the fourth wraparound portion in the capacitor body is set to at least about 20%, and the volume proportion of the effective layers in a fourth area occupying a lower half toward the other main surface in the third area is set to about 35% or less; and
external dimensions of the multilayer capacitor including the capacitor body, the first external electrode, and the second external electrode are about 2.0±0.1 mm in length by about 1.25±0.1 mm in width by about 1.25±0.1 mm in thickness.

6. The multilayer capacitor according to claim 5, wherein the first and second internal electrode groups are provided such that the effective layers extend to the first and third areas in the central portion in the thickness direction connecting the one main surface of the capacitor body and the other main surface thereof, viewed from a cross section that includes a straight line connecting the one end surface of the capacitor body and the other end surface thereof and that is perpendicular to the first and second internal electrode groups;
when the portion in which the effective layers extend to the first and third areas is referred to as a central area, effective-layer excluded portions in which the effective layers do not extend to the first and third areas are provided in an area toward the other main surface with respect to the central portion; and
$T_0/L_0$ is set to a value in a range from about 0.5 to about 1.5 where "$T_0$" denotes the dimension of each effective-layer excluded portion in the thickness direction and "$L_0$" denotes the dimension thereof in the direction connecting the one end of the capacitor body and the other end thereof.

7. The multilayer capacitor according to claim 5, wherein
a direction connecting the one end surface of the capacitor body and the other end surface thereof is a lengthwise direction, a direction connecting the one main surface of the capacitor body and the other main surface thereof is a height direction, and the direction substantially perpendicular to the lengthwise and height directions of the capacitor body is a widthwise direction; and
the dimension of the first and second external electrodes along the widthwise direction is made less that the width of the multilayer capacitor.

8. The multilayer capacitor according to claim 7, wherein the width of the external electrodes is about 92% or less of the width of the multilayer capacitor.

9. A multilayer capacitor comprising:
a capacitor body including a plurality of layered dielectric layers and having opposed end surfaces and opposed main surfaces;
a first external electrode provided on the one end of the capacitor body and including a first wraparound portion extending on one of the main surfaces of the capacitor body and a second wraparound portion extending on the other main surface thereof;
a second external electrode provided on the other end surface of the capacitor body and including a third wraparound portion extending on the one main surface of the capacitor body and a fourth wraparound portion extending on the other main surface thereof;
a first internal electrode group including internal electrodes provided between the dielectric layers and being connected to the first external electrode; and
a second internal electrode group including internal electrodes provided between the dielectric layers and being connected to the second external electrode; wherein
when a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 20%, the volume proportion of the effective layers in a second area occupying a lower half toward the other main surface in the first area is set to about 35% or less, the volume proportion of the effective layers in a third area sandwiched between the third wraparound portion and the fourth wraparound portion in the capacitor body is set to at least about 20%, and the volume proportion of the effective layers in a fourth area occupying a lower half toward the other main surface in the third area is set to about 35% or less; and external dimensions of the multilayer capacitor including the capacitor body, the first external electrode, and the second external electrode are about 3.2±0.15 mm in length by about 1.6±0.15 mm in width by about 1.6±0.15 mm in thickness.

10. The multilayer capacitor according to claim 9, wherein the first and second internal electrode groups are provided such that the effective layers extend to the first and third areas in the central portion in the thickness direction connecting the one main surface of the capacitor body and the other main surface thereof, viewed from a cross section that includes a straight line connecting the one end surface of the capacitor body and the other end surface thereof and that is perpendicular to the first and second internal electrode groups;

when the portion in which the effective layers extend to the first and third areas is referred to as a central area, effective-layer excluded portions in which the effective layers do not extend to the first and third areas are provided in an area toward the other main surface with respect to the central portion; and $T_0/L_0$ is set to a value in a range from about 0.5 to about 1.5 where "$T_0$" denotes the dimension of each effective-layer excluded portion in the thickness direction and "$L_0$" denotes the dimension thereof in the direction connecting the one end of the capacitor body and the other end thereof.

11. The multilayer capacitor according to claim 9, wherein a direction connecting the one end surface of the capacitor body and the other end surface thereof is a lengthwise direction, a direction connecting the one main surface of the capacitor body and the other main surface thereof is a height direction, and the direction substantially perpendicular to the lengthwise and height directions of the capacitor body is a widthwise direction; and the dimension of the first and second external electrodes along the widthwise direction is made less that the width of the multilayer capacitor.

12. The multilayer capacitor according to claim 11, wherein the width of the external electrodes is about 92% or less of the width of the multilayer capacitor.

13. A multilayer capacitor comprising:

a capacitor body including a plurality of layered dielectric layers and having opposed end surfaces and opposed main surfaces;

a first external electrode provided on the one end of the capacitor body and including a first wraparound portion extending on one of the main surfaces of the capacitor body and a second wraparound portion extending on the other main surface thereof;

a second external electrode provided on the other end surface of the capacitor body and including a third wraparound portion extending on the one main surface of the capacitor body and a fourth wraparound portion extending on the other main surface thereof;

a first internal electrode group including internal electrodes provided between the dielectric layers and being connected to the first external electrode; and a second internal electrode group including internal electrodes provided between the dielectric layers and being connected to the second external electrode; wherein when a portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 20%, the volume proportion of the effective layers in a second area occupying a lower half toward the other main surface in the first area is set to about 35% or less, the volume proportion of the effective layers in a third area sandwiched between the third wraparound portion and the fourth wraparound portion in the capacitor body is set to at least about 20%, and the volume proportion of the effective layers in a fourth area occupying a lower half toward the other main surface in the third area is set to about 35%; and external dimensions of the multilayer capacitor including the capacitor body, the first external electrode, and the second external electrode are about 3.2±0.3 mm in length by about 2.5±0.2 mm in width by about 2.5±0.2 mm in thickness.

14. The multilayer capacitor according to claim 13, wherein the first and second internal electrode groups are provided such that the effective layers extend to the first and third areas in the central portion in the thickness direction connecting the one main surface of the capacitor body and the other main surface thereof, viewed from a cross section that includes a straight line connecting the one end surface of the capacitor body and the other end surface thereof and that is perpendicular to the first and second internal electrode groups;

when the portion in which the effective layers extend to the first and third areas is referred to as a central area, effective-layer excluded portions in which the effective layers do not extend to the first and third areas are provided in an area toward the other main surface with respect to the central portion; and $T_0/L_0$ is set to a value in a range from about 0.5 to about 1.5 where "$T_0$" denotes the dimension of each effective-layer excluded portion in the thickness direction and "$L_0$" denotes the dimension thereof in the direction connecting the one end of the capacitor body and the other end thereof.

15. The multilayer capacitor according to claim 13, wherein a direction connecting the one end surface of the capacitor body and the other end surface thereof is a lengthwise direction, a direction connecting the one main surface of the capacitor body and the other main surface thereof is a height direction, and the direction substantially perpendicular to the lengthwise and height directions of the capacitor body is a widthwise direction; and the dimension of the first and second external electrodes along the widthwise direction is made less that the width of the multilayer capacitor.

16. The multilayer capacitor according to claim 15, wherein the width of the external electrodes is about 92% or less of the width of the multilayer capacitor.

17. A multilayer capacitor comprising:

a capacitor body including a plurality of layered dielectric layers and having opposed end surfaces and opposed main surfaces;

a first external electrode provided on the one end of the capacitor body and including a first wraparound portion extending on one of the main surfaces of the capacitor body and a second wraparound portion extending on the other main surface thereof;

a second external electrode provided on the other end surface of the capacitor body and including a third wraparound portion extending on the one main surface of the capacitor body and a fourth wraparound portion extending on the other main surface thereof;
a first internal electrode group including internal electrodes provided between the dielectric layers and being connected to the first external electrode; and
a second internal electrode group including internal electrodes provided between the dielectric layers and being connected to the second external electrode; wherein
when portion of the plurality of dielectric layers, which is sandwiched between the internal electrodes in the first internal electrode group and the internal electrodes in the second internal electrode group and in which a capacitance is produced, is defined as effective layers, the volume proportion of the effective layers in a first area sandwiched between the first wraparound portion and the second wraparound portion in the capacitor body is set to at least about 10%, the volume proportion of the effective layers in a second area occupying a lower half toward the other main surface in the first area is set to about 10% or less, the volume proportion of the effective layers in a third area sandwiched between the third wraparound portion and the fourth wraparound portion in the capacitor body is set to at least about 10%, and the volume proportion of the effective layers in a fourth area occupying a lower half toward the other main surface in the third area is set to about 10% or less; and
external dimensions of the multilayer capacitor including the capacitor body, the first external electrode, and the second external electrode are about 1.0±0.05 mm in length by about 0.5±0.05 mm in width by about 0.5±0.05 mm in thickness.

18. The multilayer capacitor according to claim 17, wherein
the first and second internal electrode groups are provided such that the effective layers extend to the first and third areas in the central portion in the thickness direction connecting the one main surface of the capacitor body and the other main surface thereof, viewed from a cross section that includes a straight line connecting the one end surface of the capacitor body and the other end surface thereof and that is perpendicular to the first and second internal electrode groups;
when the portion in which the effective layers extend to the first and third areas is referred to as a central area, effective-layer excluded portions in which the effective layers do not extend to the first and third areas are provided in an area toward the other main surface with respect to the central portion; and
$T_0/L_0$ is set to a value in a range from about 0.5 to about 1.5 where "$T_0$" denotes the dimension of each effective-layer excluded portion in the thickness direction and "$L_0$" denotes the dimension thereof in the direction connecting the one end of the capacitor body and the other end thereof.

19. The multilayer capacitor according to claim 17, wherein
a direction connecting the one end surface of the capacitor body and the other end surface thereof is a lengthwise direction, a direction connecting the one main surface of the capacitor body and the other main surface thereof is a height direction, and the direction substantially perpendicular to the lengthwise and height directions of the capacitor body is a widthwise direction; and
the dimension of the first and second external electrodes along the widthwise direction is made less that the width of the multilayer capacitor.

20. The multilayer capacitor according to claim 19, wherein
the width of the external electrodes is about 92% or less of the width of the multilayer capacitor.

* * * * *